(12) United States Patent
Lau et al.

(10) Patent No.: US 6,269,284 B1
(45) Date of Patent: Jul. 31, 2001

(54) REAL TIME MACHINE TOOL ERROR CORRECTION USING GLOBAL DIFFERENTIAL WET MODELING

(75) Inventors: Kam C. Lau, 7901-C Cessna Ave., Gaithersburg, MD (US) 20879; Quanhe Ma; Herbert Lau, both of Gaithersburg, MD (US)

(73) Assignee: Kam C. Lau, Gaithersburg, MD (US)

( * ) Notice: Subject to any disclaimer, the term of this patent is extended or adjusted under 35 U.S.C. 154(b) by 0 days.

(21) Appl. No.: 08/981,499

(22) PCT Filed: May 9, 1997

(86) PCT No.: PCT/US97/08150

§ 371 Date: Apr. 20, 1998

§ 102(e) Date: Apr. 20, 1998

(87) PCT Pub. No.: WO97/43703

PCT Pub. Date: Nov. 20, 1997

(51) Int. Cl.[7] ............................. G05B 19/18; G06F 19/00; G06G 7/66
(52) U.S. Cl. ............................. 700/193; 700/56; 700/247; 700/30; 700/31; 700/58; 700/59; 700/60; 700/61; 700/65; 700/66; 700/160; 700/186; 700/192; 700/195; 700/57
(58) Field of Search ............................. 700/57, 56, 247, 700/30, 31, 58, 59, 60, 61, 65, 66, 160, 186, 192, 193, 195

(56) References Cited

U.S. PATENT DOCUMENTS

| 4,352,778 | | 10/1982 | Arnaud et al. . | |
|---|---|---|---|---|
| 4,535,631 | | 8/1985 | Sinha et al. . | |
| 4,750,104 | * | 6/1988 | Kumamoto et al. | 364/167 |
| 5,015,937 | * | 5/1991 | Wright et al. | 318/696 |
| 5,153,490 | * | 10/1992 | Ueta et al. | 318/571 |
| 5,237,509 | * | 8/1993 | Ueta et al. | 364/474.35 |
| 5,278,405 | * | 1/1994 | Zelenka | 250/235 |
| 5,375,066 | * | 12/1994 | Yee et al. | 700/193 |
| 5,492,440 | * | 2/1996 | Spaan et al. | 409/80 |
| 5,555,347 | * | 9/1996 | Yoneda et al. | 700/257 |
| 5,578,913 | * | 11/1996 | Yasuda et al. | 318/569 |

OTHER PUBLICATIONS

International Search Report.

* cited by examiner

*Primary Examiner*—Ayaz Sheikh
*Assistant Examiner*—Frantz B. Jean
(74) *Attorney, Agent, or Firm*—Nixon Peabody LLP; Donald R. Studebaker

(57) ABSTRACT

A machine tool is controlled through a process incorporating the steps of (1) measuring geometric and thermal errors with accurate instruments, (2) creating a global differential wet model of machine tool position, and (3) using this model to control real time compensation of machine tool operation. A controller modifies encoder-type position feedback signals used by the machine to compensate for geometric and thermal errors in the manner dictated by the global differential wet model.

14 Claims, 15 Drawing Sheets

1-5 Inductive Sensors

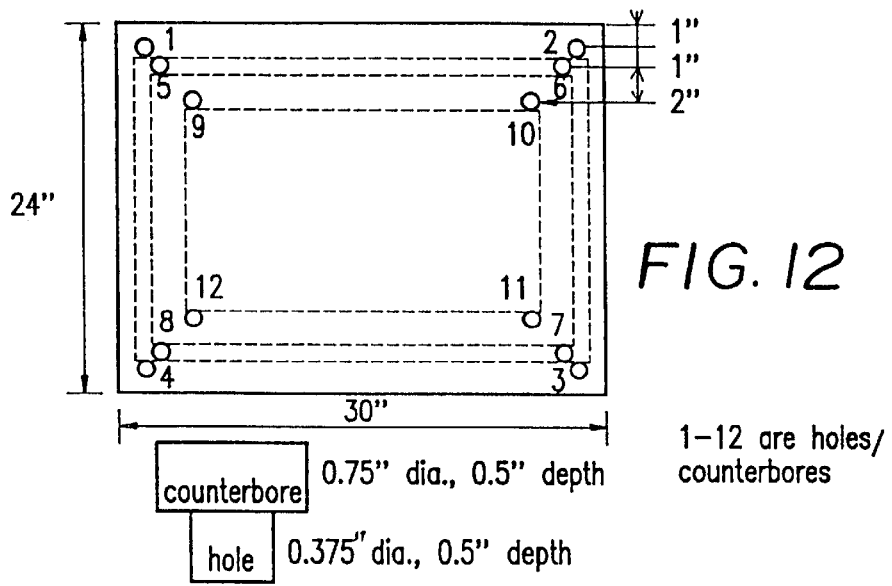
FIG. 12
1-12 are holes/counterbores
counterbore 0.75" dia., 0.5" depth
hole 0.375" dia., 0.5" depth
FIG. 13
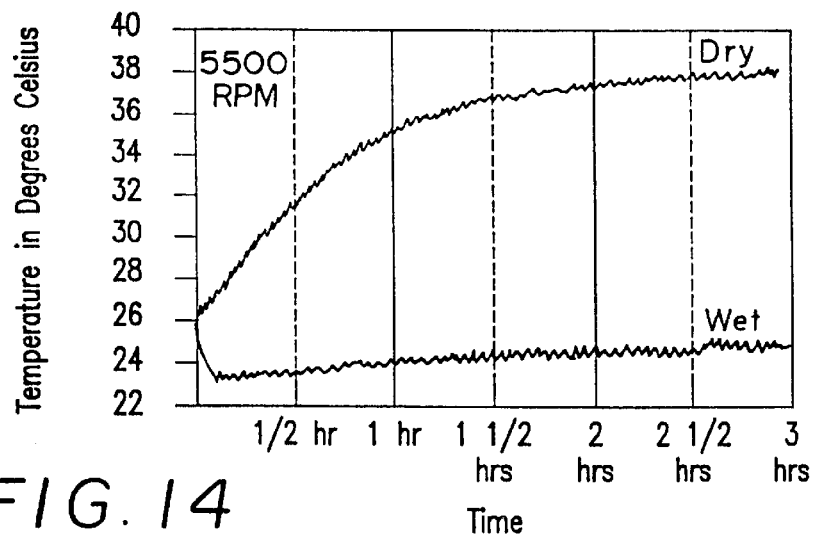
FIG. 14
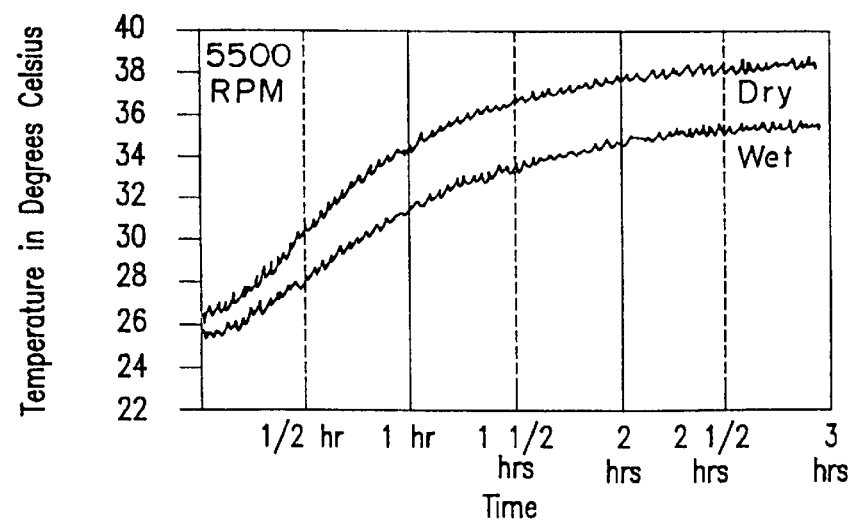

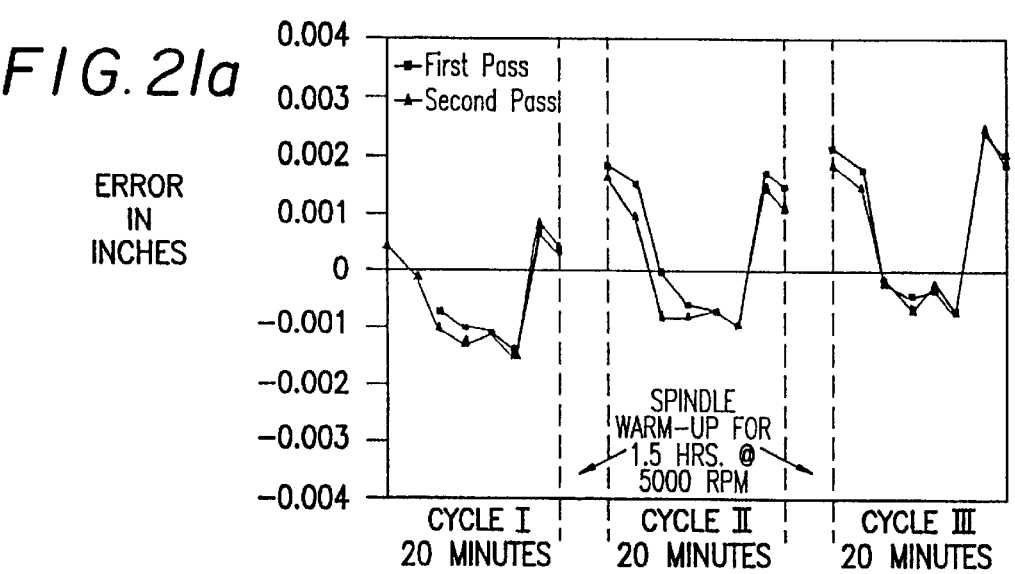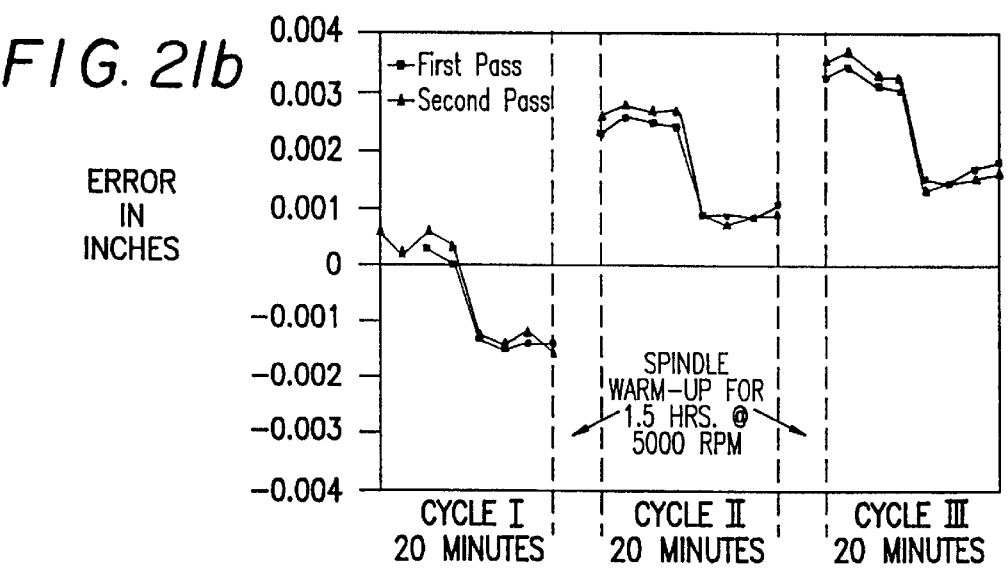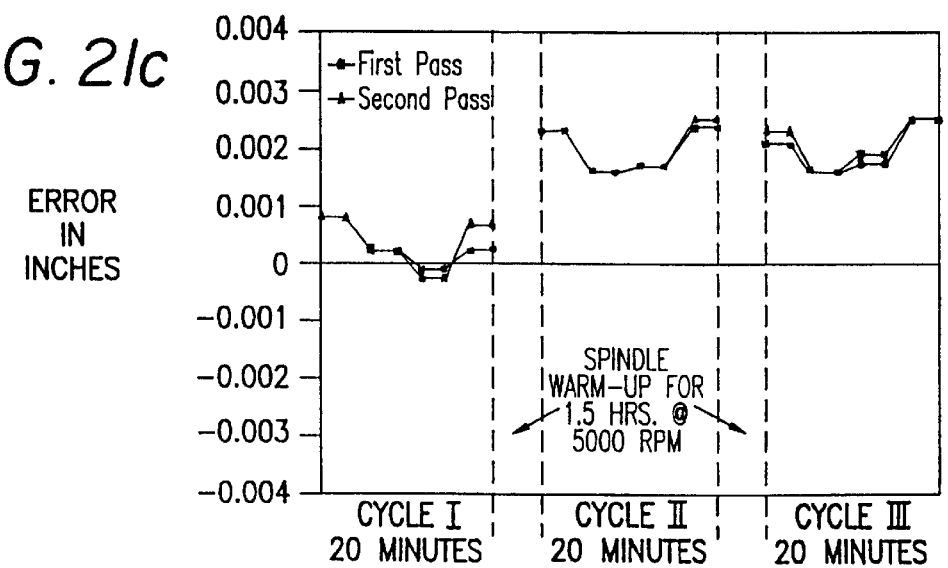

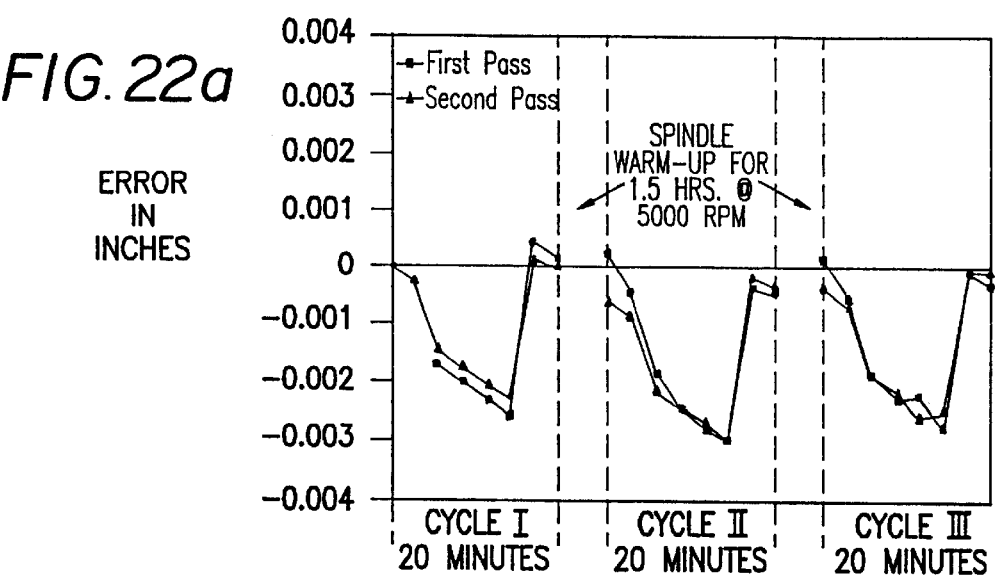
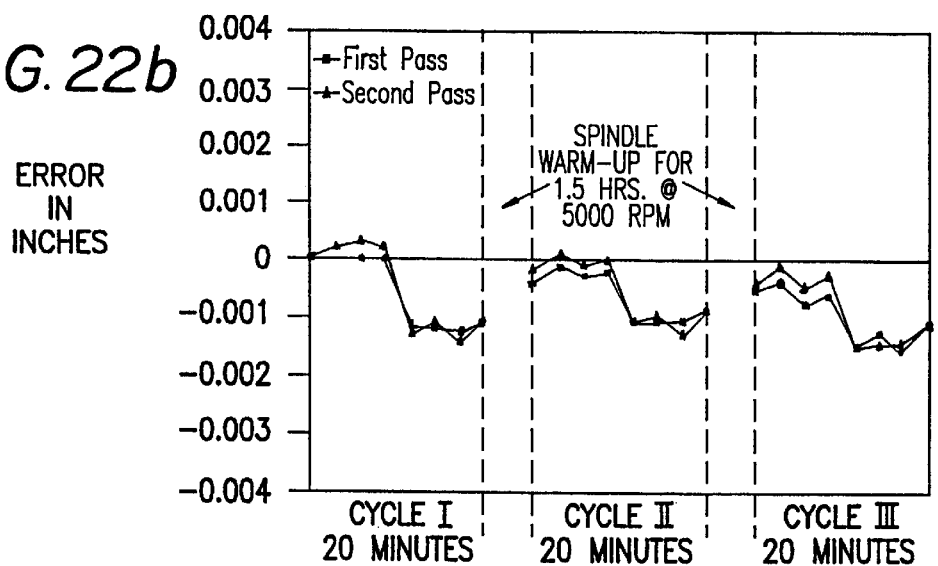
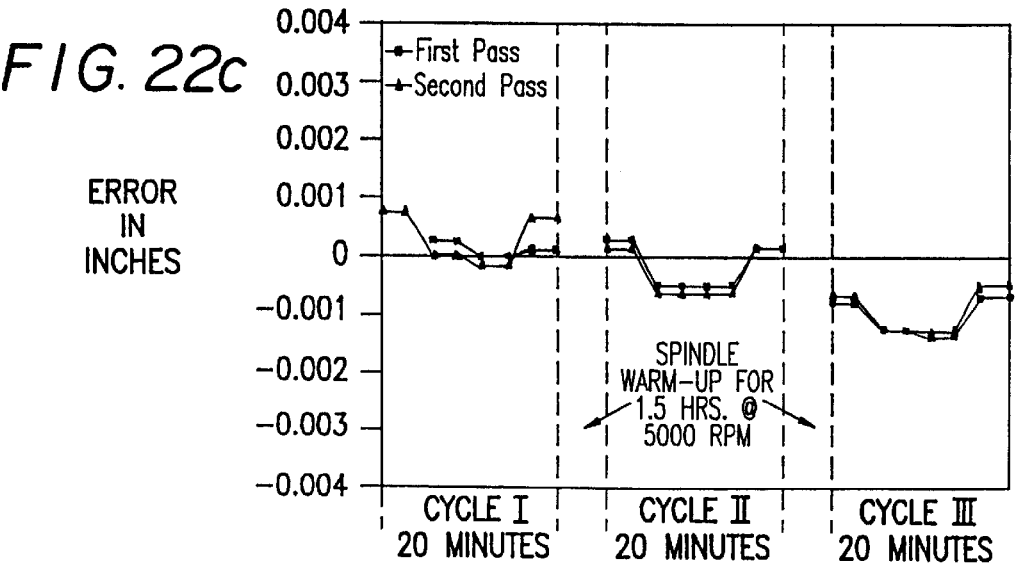

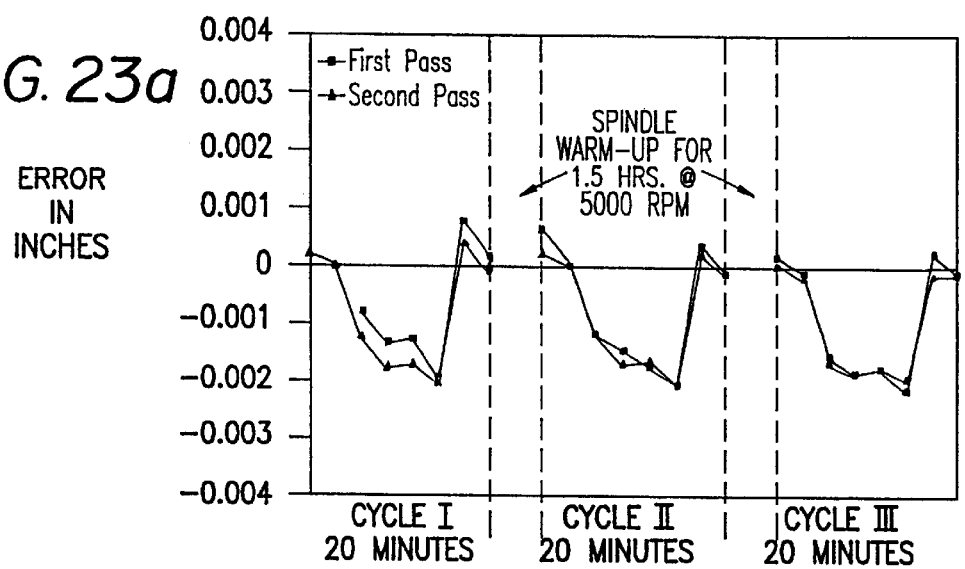
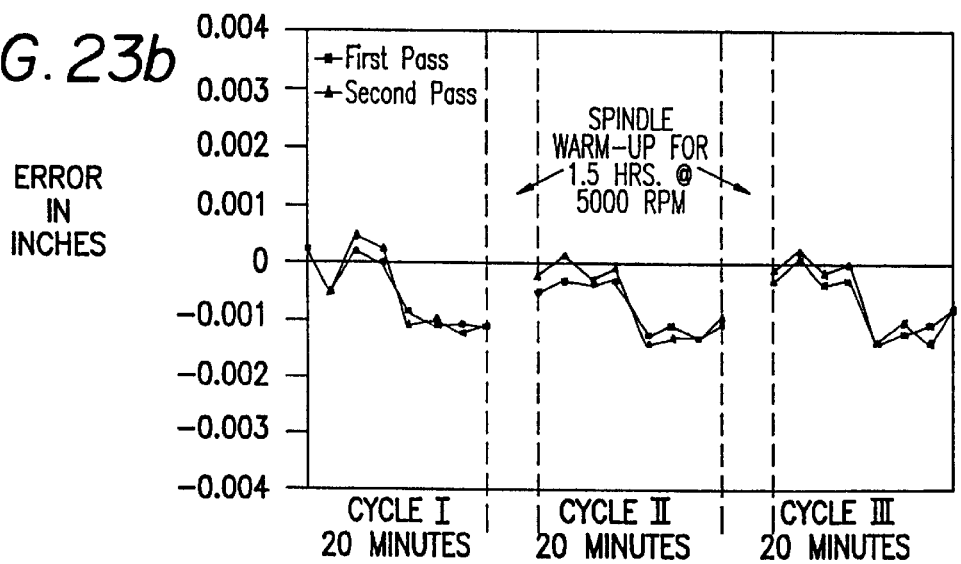
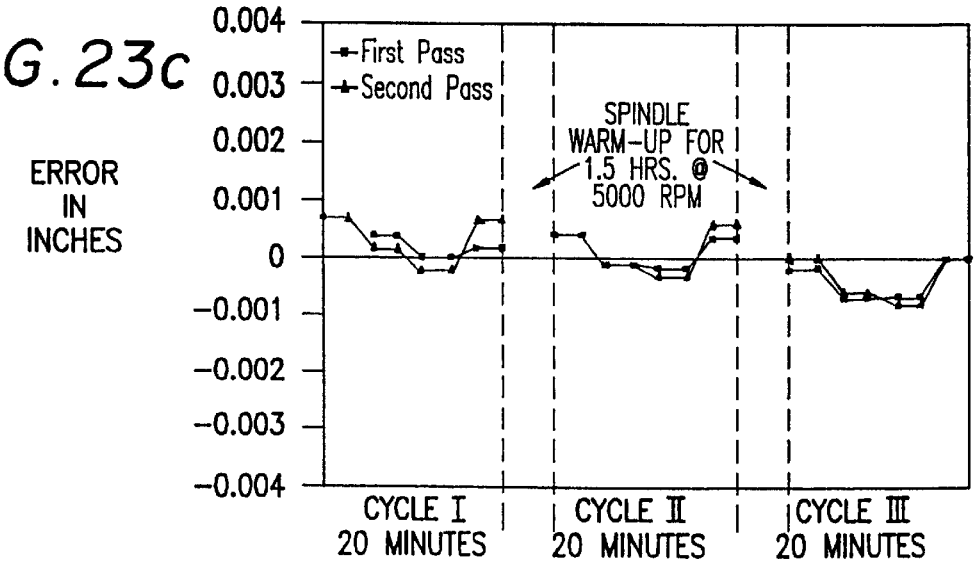

REAL TIME MACHINE TOOL ERROR CORRECTION USING GLOBAL DIFFERENTIAL WET MODELING

BACKGROUND OF THE INVENTION

1. Field of the invention

The present invention relates generally to a novel apparatus which provides real time compensation for geometric and thermal errors in positioning of computer numerically controlled machine tools, coordinate measuring machines (CMMs) robots, assembly systems, and the like, and to an improved method for modeling geometric and thermal errors which is useful in real time control of such an apparatus.

2. Background Discussion

With ever increasing demand for part quality and tight tolerances in machining, it is required that machine tools be accurate and repeatable within desired tolerance limits over the entire machining volume, and in a wide variety of operating conditions. However, in practice, machine tool manufacturer specified accuracies and repeatability are not achieved under operating conditions, due to a wide variety of errors induced in the machine tool by virtue of its geometry and assembly, thermal expansion of the machine components and the process itself. These errors in general, are not within acceptable limits and need to be eliminated or reduced to achieve the desired part dimensional accuracy. In order to eliminate or reduce or compensate for these errors, it is necessary to characterize the machine, understand the process and evaluate the performance of the machine in a real machining environment.

Thermally induced error is a major source of machine tool inaccuracy. After conducting an extensive study, Peklenik remarked that thermal errors could contribute as much as 70% of the machining error. These thermally induced errors arise due to non-uniform heat generation within the machine structure, resulting in growth and tilt of the spindle and the various structural components. The heat dissipated from motors, bearings, cutting process and other heat generating components are also always unevenly distributed within the machine structure. These, together with the effects of ambient temperature changes and cutting coolant temperature changes, cause structural distortions of the machine tool. These temperature effects are in part inherent in cutting and movement operations, but in part occur because heat sources, such as motors, slides, and the machining operation itself have not been given careful consideration at the machine design stage, even though it is known that a design will generate temperature gradients during the operation of a machine. It is these temperature gradients that cause "thermal growth" in machine components.

Conventionally, this thermal growth is controlled through the use of coolants. It is not uncommon to install chillers on machine tools to precisely control the temperature of coolants. These accessories contribute to the low reliability and low up time of the machining process.

There are two methods that are commonly used in reducing thermally induced errors on machine tools: error avoidance and error compensation.

Error avoidance techniques are often implemented at the machine-design stage. These include designs to minimize the effects of heat generation within the machine structure and control the gradient of and change in environmentally encountered temperatures. For example, J. B. Bryan of Lawrence Livermore Laboratory was successful in achieving thermal stability by immersing the whole machine in a temperature-controlled "oil bath," as reported in "Technology of Machine Tools," UCRL Vol. 5, 1980. However, this method is very expensive and is thus impractical for production machines. A more practical method implemented by some machine-tool builders on expensive machines makes use of a temperature-controlled oil shower applied around the spindle area where the major thermal growth is typically found. In general, this method can help reduce the thermal growth error by as much as 50%. Of course the cost of constructing and operating the machine is increased.

Early research work in error compensation was primarily directed to direct measurement techniques, as described for example by Goodhead et al, "Automatic Detection of and Compensation for Alignment Errors in Machine Tool Slideways" Proceedings of $18^{th}$ MTDR Conference, 1977, and Bryan et al., "Design of a New Error-Corrected Coordinate Measuring Machine," Precision Engineering, Vol. 1, 1979. However, with these techniques very sensitive measurement instruments must be attached to the machine. In a high volume production environment, maintenance of these instruments presents considerable difficulties for plant personnel. Current practice in manufacturing precision parts often involves compensation for various errors through periodic gaging of parts. Production is interrupted and manual compensating offsets are input to the controller. Also, additional production costs are introduced due to requirement of initial warm up cycles without cutting parts, and utilization of chillers for temperature controlled coolants.

More sophisticated error compensation techniques have been proposed, based on a knowledge of the thermal growth characteristics of the machine and use this "thermal model" in real-time to predict the thermal growth. A digital processor utilizes this model to calculate the error information which is then sent to the machine's CNC controller to compensate for the sensed error. This error information is often in the form of tool offset commands.

By using multiple thermal sensors to measure actual temperatures of major heat sources, and sensors to measure thermal growth (in the X-, Y- and Z-axis directions, and in pitch and yaw), a computer-controlled modeling system will collect and store the data while the machine spindle is running. After enough data is collected, the system will establish a thermal model by analyzing the correlation between the temperatures and the thermal growth of each axis of the machine. As soon as the performance of the model is verified, the model can be used in real-time to predict the thermal growths of the machine by using only actual temperature information. See Donmez et al., "A Real Time Error Compensation System for a Computerized Numerical Control Turning Center," Proceedings of the IEEE International Conference on Robotics and Automation, San Francisco, April 1986, and Donmez et al., "A General Methodology for Maching Tool Accuracy Enhancement by Error Compensation," Precision Engineering, Vol. 8, No. 4, October 1986.

Real time error compensation techniques using modeling have attracted the interest of machine tool manufacturers and users. Recent research on thermal error compensation conducted by F. Rudder and A. Donmez of NIST involved the establishment of a real-time geometric/thermal (G-T) model to characterize the thermal behavior of a vertical spindle machining center and a turning center. The geometric error data at various thermal states of the machine conditions were acquired and used to build the G-T model. This study was reported in "Progress Report for the Quality in Automation Project for FY 90," National Institute of Standards and Technology, March 1991.

These methods viewed a machine tool, fixture and workpiece system as a chain of linkages of rigid bodies. This work is based on spatial relations between these linkages using homogeneous coordinate transformation matrices. See R. P. Paul, "Robot Manipulators: Mathematics, Programming, and Control" MIT Press 1981. In the course of machine characterization, with machine positioning and dry cycling tests geometric/thermal errors and models are derived for each element of the machine tool linkage. Then utilizing the homogeneous transformations the total error for the tool tip, relative to workpiece, is established and is compensated for during machining cycles. Laboratory tests suggest that this technique may be highly effective in reduction of machine tool errors. However, in practice the machine characterization takes too long and is not suitable for a high volume production environment, where a major machine crash or a spindle rebuild may necessitate a full or partial recharacterization.

J. S. Chen and J. Ni of the University of Michigan (UM) developed a time-variant volumetric error model which synthesizes both the geometric and thermal errors of a machining center, as reported in "Real Time Compensation for Time Variant Volumetric Error on a Machining Center," Journal of Engineering for Industry, Vol. 115, pp. 472–479, 1993. A 21-parameter kinematic model was used to establish the geometric model of the machine. An 11 parameter thermal growth model was used to establish the spindle growth parallel to the primary axes of the machine. All together, a 32 parameter G-T model was established. In both cases, tests were conducted in a laboratory environment under dry, no load conditions. A laser interferometer system was used for the 21 geometric parameter measurements, and a combination of laser and capacitance measurements were used for the 11 parameter thermal growth measurements. The models took 2 to 6 months to establish, far too long to be practical in industry. The accuracy improvement was about 90% for simple warm-up and cool-down cycles of the machine. Thus, the conventional approaches adopted for machinery geometric and thermal error characterization are extremely time consuming.

There were also early attempts to model the entire machine tool structure utilizing the Finite Element Analysis (FEA) approach. In these analytical approaches, it is assumed that the machine structure is homogeneous and that the heat dissipation throughout the structure follows the laws of thermal conductivity. These assumptions are then used to establish the model. However, the boundary conditions of two mating surfaces, which often greatly affect the predicted thermal transitivity, are very difficult to estimate with good accuracy, as can be seen in "Analysis of Thermal Deformation of Machine Tool Structure and its Application," MTDR Conference Proceedings, Vol. 17, 1976. In addition, it is also difficult to estimate the amount of heat generated and dissipated without making actual measurements on the machine. The lack of precise knowledge of the many boundary conditions and the difficulties associated with heat dissipation factors tend to produce inaccurate results.

The prior art models were based on machine positioning variance measurements at particular measured ambient temperature values, and did not use global measurement techniques or wet modeling techniques.

Thus, none of the prior approaches to modeling thermal and geometric errors have been entirely satisfactory, and no robust, effective system has been made available for real time correction of geometric and positioning errors in an industrial setting.

SUMMARY OF THE INVENTION

Therefore, it is a general object of the invention to provide an improved system and method for precision control of a machine to compensate for geometric and thermal positioning errors in real time.

Another object of the invention is to provide a real time error compensation and control system and method based on an empirically generated model of geometric and thermal errors.

It is another object of the invention to provide an improved control system and method for real time error correction in a precision machine based on a differential thermal model.

A further object of the invention is to provide an improved control system and method for real time error correction in a precision machine based on a wet thermal model.

An additional object of the invention is to provide an improved control system sled method for real time error correction in a precision machine based on a global thermal model.

Another significant object of the invention is to provide an improved system and method for quickly developing a global model of thermal and geometric errors in a precision machine.

These objects and others which will become apparent on review of the specification and claims are achieved by controlling a machine tool through a process incorporating the steps of (1) measuring geometric and thermal errors with accurate instruments, (2) creating a global differential wet model of machine tool position, and (3) using this model to control real time compensation of machine tool operation. In a preferred embodiment, a controller modifies encoder-type position feedback signals used by the machine to compensate for geometric and thermal errors in the manner dictated by the novel global differential wet model.

BRIEF DESCRIPTION OF THE DRAWINGS

FIG. 12 is a top view showing positioning of holes placed in an aluminum plate as a test of model accuracy;

FIG. 13 is a graphical comparison of temperature gradients induced in dry and wet machining environments in front of the spindle housing;

FIG. 14 is a graphical comparison of temperature gradients induced in dry and wet machining environments for the rear of the spindle housing;

FIGS. 21a, 21b, and 21c are graphs showing positioning errors observed in X, Y, and Z axes respectively in cold start (cycle I), intermediate warm up (cycle II) and warm (cycle III) conditions, without error compensation according to the present invention;

FIGS. 22a, 22b, and 22c are graphs showing positioning errors observed in X, Y, and Z axes respectively in cold start (cycle I), intermediate warm up (cycle II) and warm (cycle III) conditions, in a second test with compensation according to the present invention;

FIGS. 23a, 23b, and 23c are graphs showing positioning errors observed in X, Y. and Z axes respectively in cold start (cycle I), intermediate warm up (cycle II) and warm (cycle III) conditions, in a third test with compensation according to the present invention.

DETAILED DESCRIPTION OF THE PREFERRED EMBODIMENTS

The present invention will be described primarily with reference to computer numerically controlled machine tools, but those skilled in the art will recognize that the inventive modeling and real time control concepts disclosed herein are equally applicable to various types of coordinate measuring machines (CMMs) robots, assembly systems, and the like, and the inventors contemplate that these concepts may be applied to any type of machine where precision control of the position of a machine element is desired.

The steps in controlling a machine tool using the present invention broadly include: measuring geometric and thermal errors with accurate instruments, creating an advanced model using novel methods, and using this model to control real time compensation of machine tool operation. A preferred embodiment of the method of the present invention will now be described in more detail with reference to FIG. 1.

Figure 1:
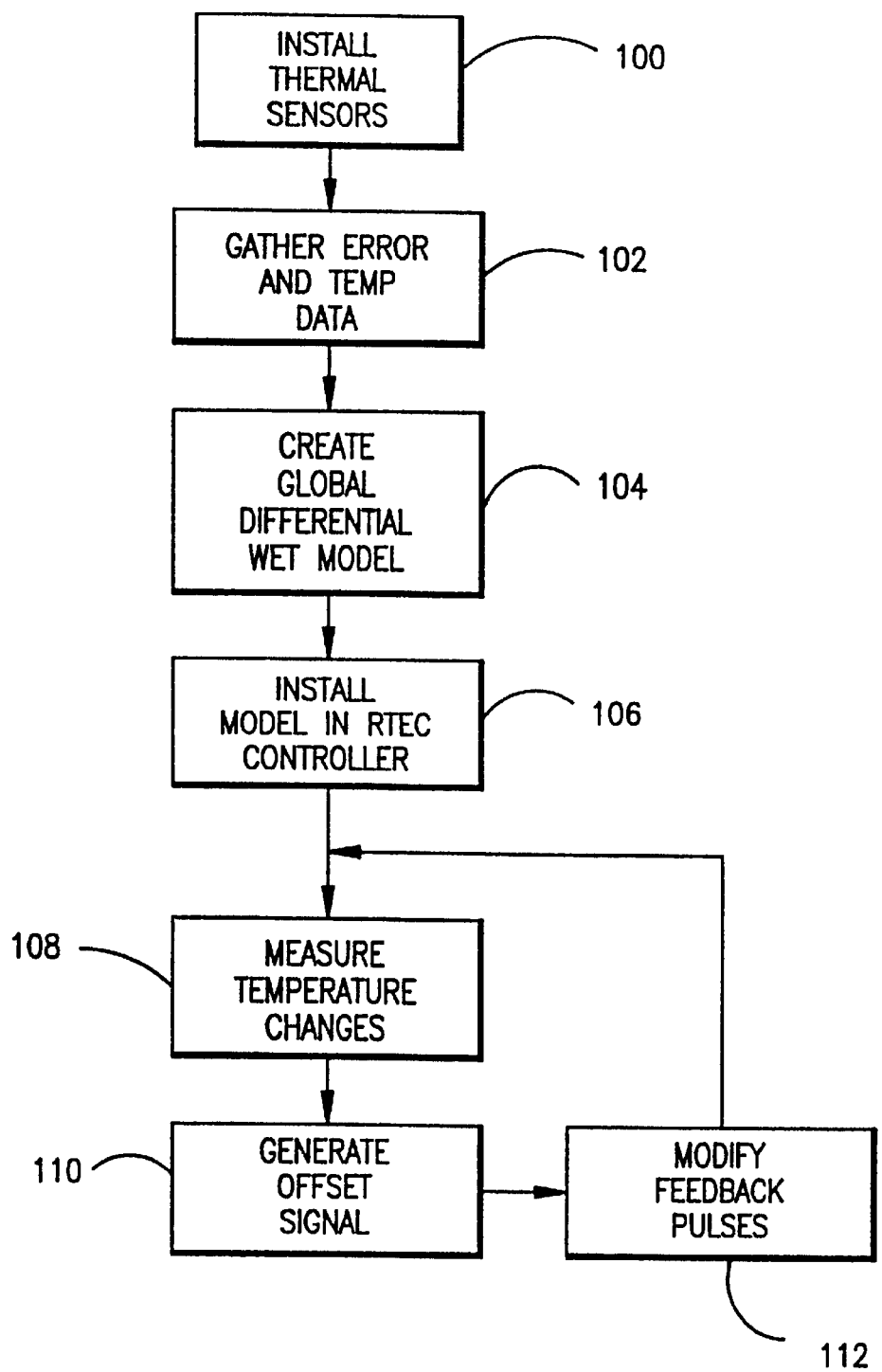
FIG. 1 is a flowchart generally showing a modeling and control process according to the present invention.

FIG. 1 is a flowchart showing a preferred embodiment of the modeling and compensation method according to the present invention. In step 100, a large number of thermal sensors are installed in various locations on the equipment to be modeled. Then, in step 102, precision positioning sensors are used to gather position error data at a variety of temperature offsets relative to initial temperatures at each sensor. In step 104, a reduced number of temperature sensors are selected for use in the model, using correlation and autocorrelation algorithms, and a global differential wet model of the equipment is created. In step 106, the model is installed in a computer, which then receives temperature sensor inputs and calculates a predicted positioning error based on the model.

During actual machine operation, a loop including steps 108, 110, and 112 is executed. In step 108, temperature changes are measured by sensors installed at the selected (numerically reduced) temperature sensor locations used in the final model. In step 110, error offset signals are generated by the model and transmitted to a real time error compensation (RTEC) controller. As indicated in step 112, preferably, this RTEC controller is of a type which intercepts a position sensor feedback pulse train, and modifies the pulse train fed to the equipment position controller, to correct positioning errors based on a position error input signal generated by the model.

The process of developing the model according to the invention will now be described in detail. To develop the model according to the present invention, positioning errors resulting from both geometric and thermally induced errors are measured globally with precision measuring instruments. This error data may preferably be collected using WINNER 2.0 equipment available from Automated Precision, Inc. (API), Gaithersburg, Maryland. The WINNER 2.0 system consists of eight modules: telescopic ballbar, 5-D laser interferometer, spindle rotation error analyzer, dual-axis tilt analyzer, repeatability analyzer, autocollimator, compliance analyzer and spindle thermal growth analyzer. Temperature sensors used in the invention are preferably high-precision inductance sensors also available from API as part of the API THERMAC brand spindle dynamic and thermal analysis system. Using this equipment, data is simultaneously collected for both geometric and temperature-induced errors, and the resulting model corrects both types of errors.

In general, the preferred modeling method incorporates "global differential wet modeling" and the modeling data is collected based on this goal. This terminology identifies several novel and significant features of this model.

The term "global modeling" is used to describe a unique feature of the present invention whereby data is directly collected on the relative position of the part to be worked relative to the machine tool mounting location, rather than creating the model by viewing the machine and its tooling as a chain of linked items, and adding the detected position errors between each of the chained items to obtain a total error, as in the prior art. The inventors have found that performance of any model depends largely on how accurately the factors involved are modeled according to their weights. In the global methodology, it is assumed that the relative errors between the tool tip and the workpiece are the cumulative effect of the errors associated with each of the components of the machine. Thus, automatic compensation for error according to the present invention is obtained using a model that directly predicts global positioning error between the tool tip and the workpiece, arising from all components between the tool tip and the workpiece.

Wet modeling is also used in the present invention. The inventors have found that spindle growths under dry and wet conditions are different due to the different thermal gradients induced, and have found that it is particularly advantageous to develop a thermal error prediction model that considers the effect of coolant flow. This finding is contrary to conventional wisdom in the industry; those skilled in the art might have expected the coolant to reduce thermal growth in the system. Contrary to this expectation, the inventors found through detailed study that the presence of coolant actually increases thermal growth. The term "wet modeling" is used herein to describe the technique according to the present invention in which the model further incorporates the effects of normal coolant flow in the machine on position error. That is, model data is collected during operation of the machine with a normal operational coolant flow.

The differences in heat capacitance of various components, and their different thermal characteristics even under dry conditions make thermal error modeling complex. Thus, a differential thermal parameter modeling technique is preferably implemented using differential temperature measurements and multi-regression analysis techniques. The term "differential modeling" is used to describe this novel technique used in the present invention, in which error produced by a particular change in temperature is measured and used in the model, rather than directly relying on measured errors at specific operating temperatures, which may not reflect the positioning errors experienced at other temperatures. Differential modeling permits the same model to be used with a variety of operating temperature ranges, since the resulting model is capable of predicting errors resulting from a defined change in ambient temperature, and these predictions can be accurately applied at a variety of operating temperatures.

To develop the model according to the present invention, geometric errors are quantified by conducting standard ballbar tests, linear displacement error measurements and positioning error measurements. Thermal errors are quantified by mapping the temperature profiles of various components and thermal drift of the spindle nose under a series of test conditions ranging from cold start in dry environment to fully warm up conditions in wet environment.

The modeling process will be described using (as an example) a five axis CNC machining center for geometric and thermal characterization. For purposes of this example, tests (both characterization and actual machining) will be described in the context of a horizontal spindle position, but it will be understood that this methodology is similarly applied to other desired positions.

Geometric characterization of the machine is carried out in three phases:

(i) Contouring error measurement is performed in XY, YZ and ZX planes in clockwise and counterclockwise directions using a telescopic ballbar which also indicates backlash error, servolag error, squareness error etc.

(ii) Linear displacement error measurement is performed in X, Y and Z axes in a bi-directional sense using a laser interferometer, which also gives reversal errors and repeatability.

(iii) Positioning error measurement in spindle is performed in X, Y and Z axes for tool changes using noncontact capacitive gages.

Figure 2:
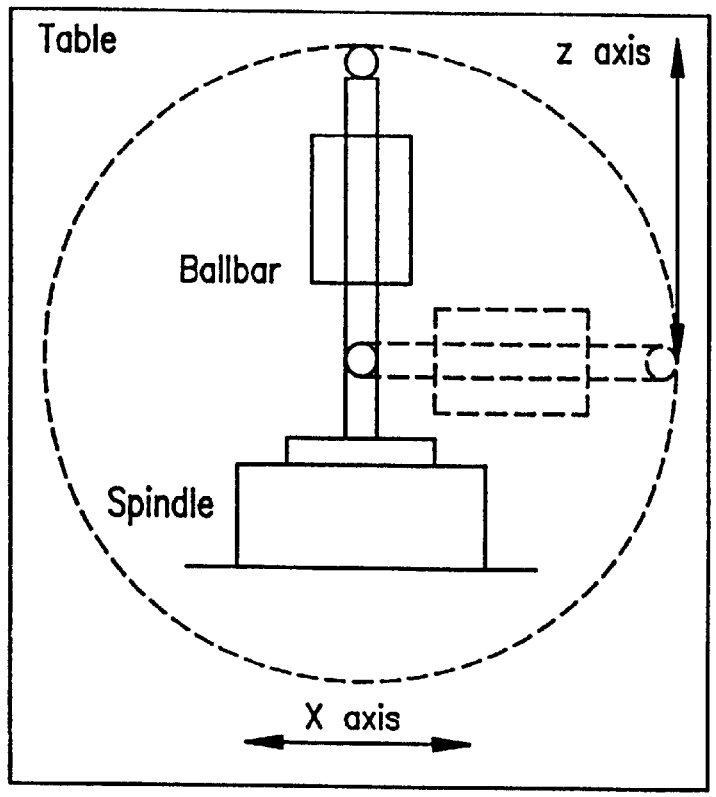
FIG. 2 is a schematic diagram of the set up of a telescopic ballbar for measurement of contouring error to build the model used in the present invention.

A schematic of the set up of a telescopic ballbar for measurement of contouring error is shown in FIG. 2. A full 360° is swept in both clockwise and counterclockwise directions at three different traverse speeds (10 in/min., 50 in/min. and 100 in/min.) in all the three planes XY, YZ, and ZX. The total error and reversal errors observed are listed in Table 1. It may be observed that the errors increased with an increase in traverse speed, thus indicating that dynamic characteristics of machine components contribute to contouring error.

TABLE 1

| | Contouring Errors | | | |
|---|---|---|---|---|
| Sl.# | Meas. Plane & Direction | Travel Speed in/min. | Total Error inches | Reversal Error inches |
| 1 | XY CW | 10 | 0.0009 | 0.0003 (−X) |
| 2 | XY CCW | 10 | 0.0008 | 0.0001 (Y) |
| 3 | XY CW | 50 | 0.0009 | 0.0002 (X) |
| 4 | XY CCW | 50 | 0.0012 | 0.0002 (−Y) |
| 5 | XY CW | 100 | 0.0011 | 0.0002 (−X) |
| 6 | XY CCW | 100 | 0.0020 | 0.0003 (−Y) |
| 7 | YZ CW | 10 | 0.0013 | 0.0002 (Z) |
| 8 | YZ CCW | 10 | 0.0011 | 0.0001 (Y) |
| 9 | YZ CW | 50 | 0.0015 | 0.0008 (Z) |
| 10 | YZ CCW | 50 | 0.0011 | 0.0002 (Y) |
| 11 | YZ CW | 100 | 0.0024 | 0.0018 (Z) |
| 12 | YZ CCW | 100 | 0.0018 | 0.0003 (Y) |
| 13 | ZX CW | 10 | 0.0006 | 0.0002 (X) |
| 14 | ZX CCW | 10 | 0.0007 | 0.0002 (Z) |
| 15 | ZX CW | 50 | 0.0009 | 0.0004 (−X) |
| 16 | ZX CCW | 50 | 0.0010 | 0 0002 (Z) |
| 17 | ZX CW | 100 | 0.0017 | 0.0009 (−X) |
| 18 | ZX CCW | 100 | 0.0014 | 0.0001 (Z) |

Figure 3:
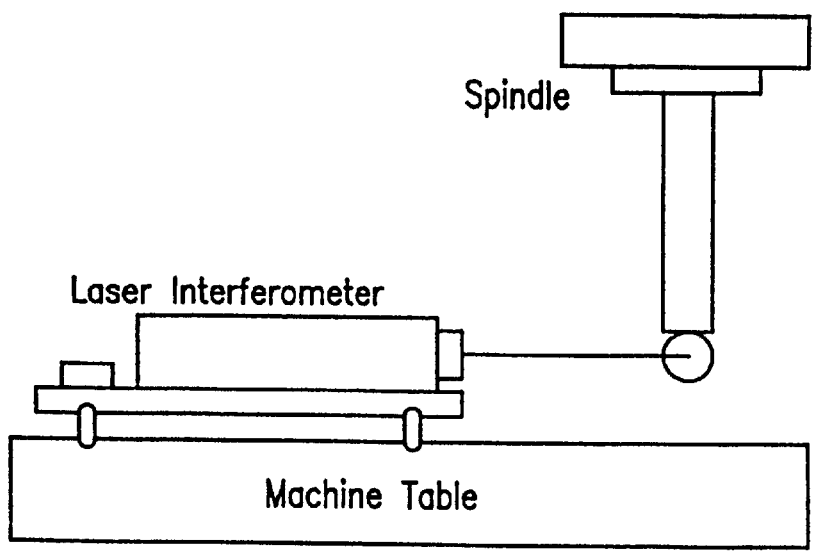
FIG. 3 is a schematic diagram of the set up for measurement of linear displacement error.

A schematic of the set up for measurement of linear displacement error is shown in FIG. 3. A relative motion between laser source and the target is induced by moving the machine table at a traverse speed of 64 in/min. Depending on overall travel of the axes, the traverse lengths and displacement increments were as follows: X Axis: Travel 24", increment 2"; Y Axis: Travel 28", increment 2.8"; Z Axis: Travel 60", increment 6".

Figure 4A:
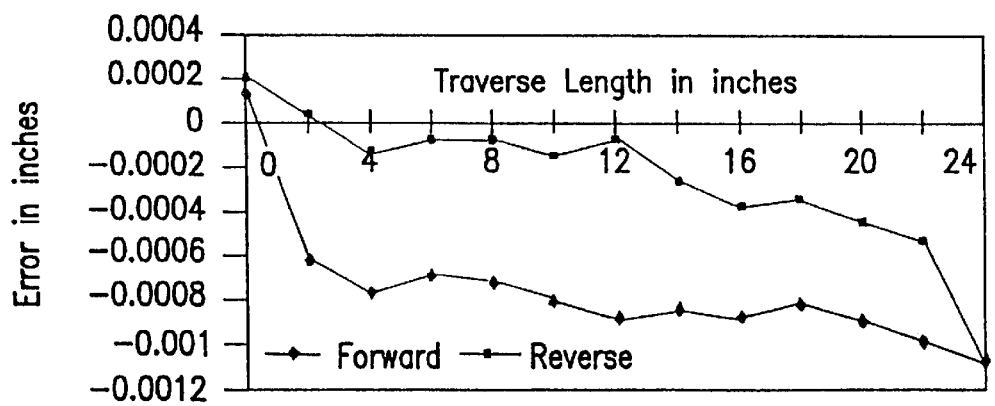
FIGS. 4a, 4b, and 4c are plots of measured average linear displacement error in both forward and reverse directions for X, Y and Z axes respectively, for the modeling example described in the specification measured according to the set up of FIG. 3.
Figure 4B:
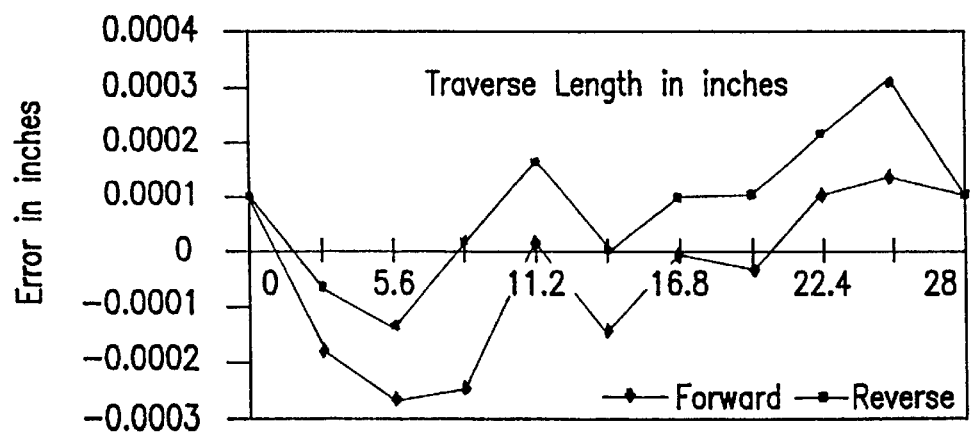
Figure 4C:
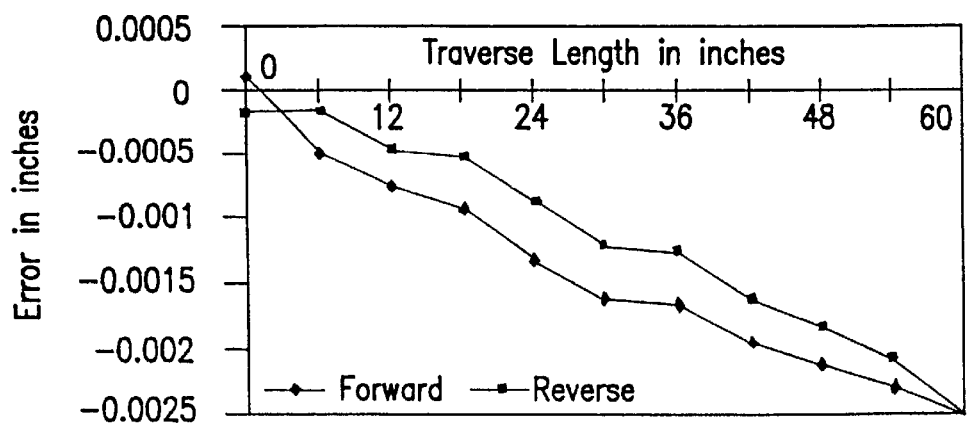

The relative position of the machine is displayed in real time and recorded. Bi-directional measurements are performed to assess backlash error and repeatability in each axis. Three runs were conducted and the average value is reported for each axis. Table 2 shows the linear displacement errors obtained in the example. The plots of average linear, displacement error in both forward and reverse directions for X, Y and Z axes are shown in FIGS. 4a, 4b, and 4c respectively. These errors are relatively high indicating improper offset compensation through the machine controller.

TABLE 2

| | Linear Displacement Errors | |
|---|---|---|
| Axis | Max. scale Error inches | Reversal Error inches |
| X | 0.0013 | 0.0004 |
| Y | 0.0006 | 0.0002 |
| Z | 0.0027 | 0.0003 |

Figure 5:
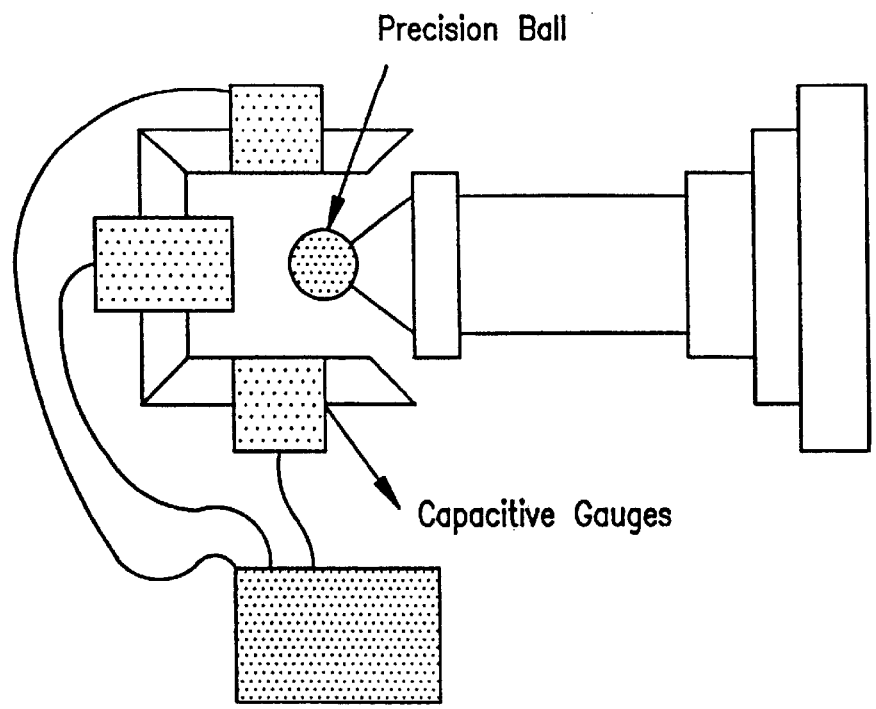
FIG. 5 is a schematic diagram of a set up for measuring positioning error in X Y and Z axes according to the present invention.

A schematic of the set up for measuring positioning error in X Y and Z axes is shown in FIG. 5. A precision sphere attached to a tool holder was installed in the spindle and positioned at a reference point. Non-contact capacitive gages mounted in a sensor seating fixed to the table measure the position of the sphere in X, Y and Z axes which is in turn the position of the machine. The spindle was then retracted, the tool holder with precision sphere was placed in the tool magazine and arbitrary slide movements at traverse speed of 300 inches/min. were performed in X, Y and Z axes, simulating machining cycles without rotating the spindle.

Figure 6:
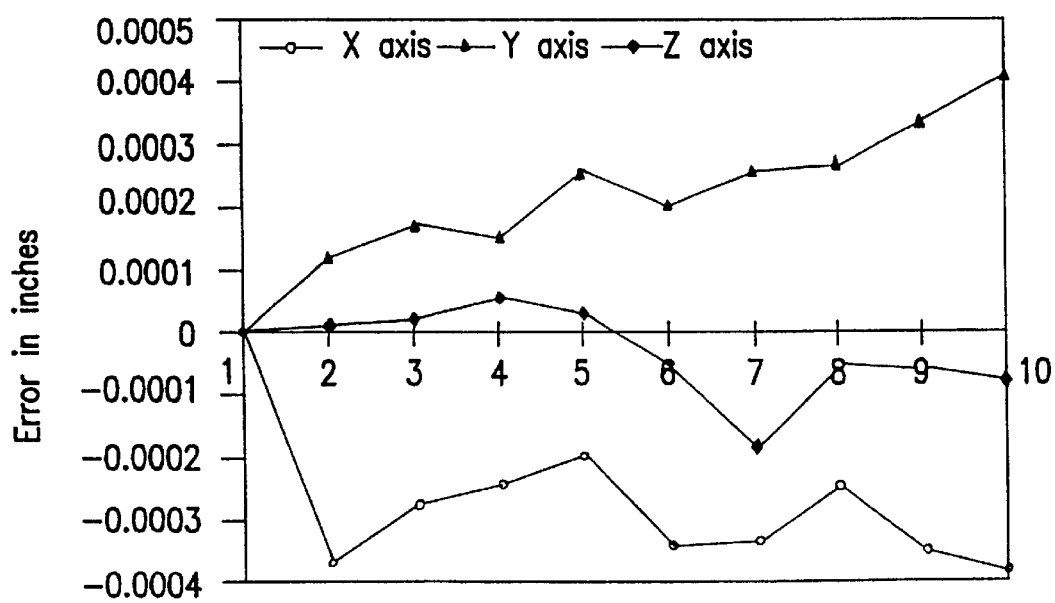
FIG. 6 is a graph showing measured positioning errors using the set up of FIG. 5.

Then the tool holder with precision sphere was picked up from the tool magazine and brought back to the reference point. The position of the sphere in X, Y and Z axes is recorded by the capacitive gages. This process was repeated ten times and the position of the sphere was recorded each time. Table 3 shows the positioning errors observed which are represented graphically in FIG. 6. The results indicate relatively repeatability characteristics of the machine.

TABLE 3

Positioning Errors

| Rum# | Positioning Error inches | | |
|---|---|---|---|
| | X axis | Y axis | Z axis |
| 1 | 0.0000 | 0.0000 | 0.0000 |
| 2 | −0.0004 | 0.0001 | <0.0001 |
| 3 | −0.0003 | 0.0002 | <0.0001 |
| 4 | −0.0002 | 0.0002 | <0.0001 |
| 5 | −0.0002 | 0.0003 | <0.0001 |
| 6 | −0.0003 | 0.0002 | <0.0001 |
| 7 | −0.0003 | 0.0003 | 0.0002 |
| 8 | −0.0002 | 0.0003 | <0.0001 |
| 9 | −0.0004 | 0.0003 | <0.0001 |
| 10 | −0.0004 | 0.0004 | <0.0001 |

Figure 7:
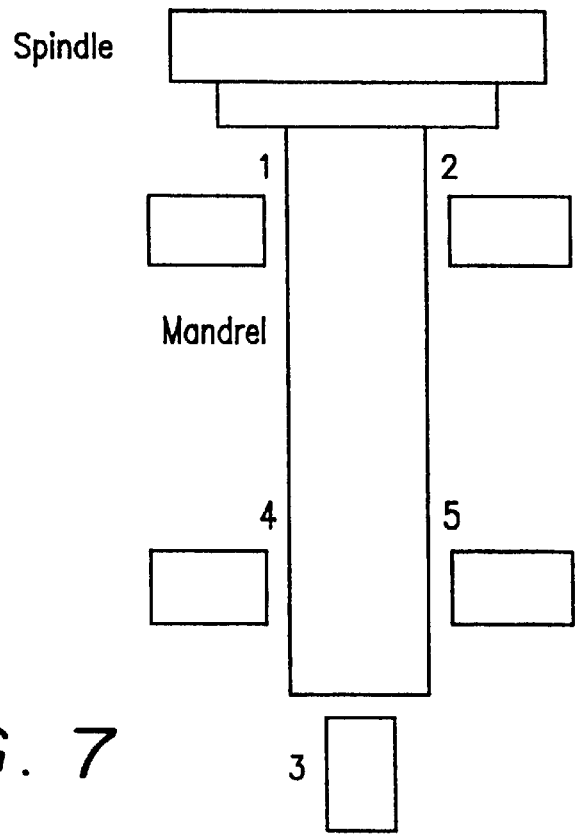
FIG. 7 is a schematic diagram of a set up for measurement of spindle growth, tilt and drift for the spindle in horizontal position.
Figure 8:
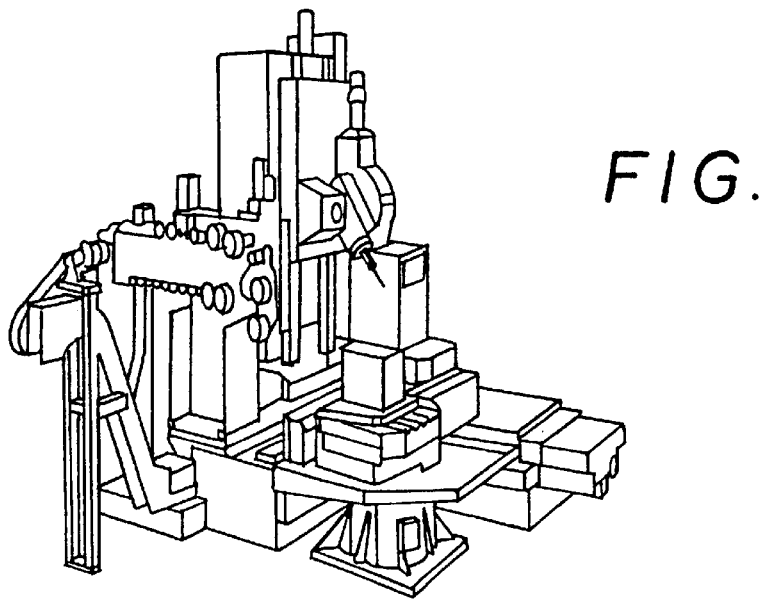
FIG. 8 is an assembly diagram showing the locations of thermocouple mounting on the machine for collecting temperature data used to generate the model according to the present invention.

Thermal characterization is more complex, for it involves monitoring temperature profiles at various locations and spindle drift in several tests under various operating conditions. Attempts made in the past to characterize thermal growth effects on spindle were limited in that they involved long characterization time, characterization only under dry conditions, and characterization based on analytical rather than experimental data. As noted above, the methodology described here is based on global modeling which requires significantly less time. The primary set up for measurement of spindle growth, tilt and drift for all the tests was the same, and is shown in FIG. 7 for the spindle in horizontal position. It consists of five high performance non-contact inductive gages mounted on a sensor holder. Sensors 2 and 5 measure drift in X axis, 1 and 4 have a 90° offset and measure drift in Y axis and sensor 3 measures growth in Z axis. Twenty thermal sensors embedded in magnetic bases were mounted on all critical locations of the machine to ensure complete thermal mapping. FIG. 8 shows the location of the thermocouples mounted on the machine. A dedicated computer analyzes and displays the data in real time.

The following tests were conducted: (i) Horizontal spindle position, cold-start condition, dry environment; and (ii) Horizontal spindle position, cold-start condition,, wet environment.

Figure 9:
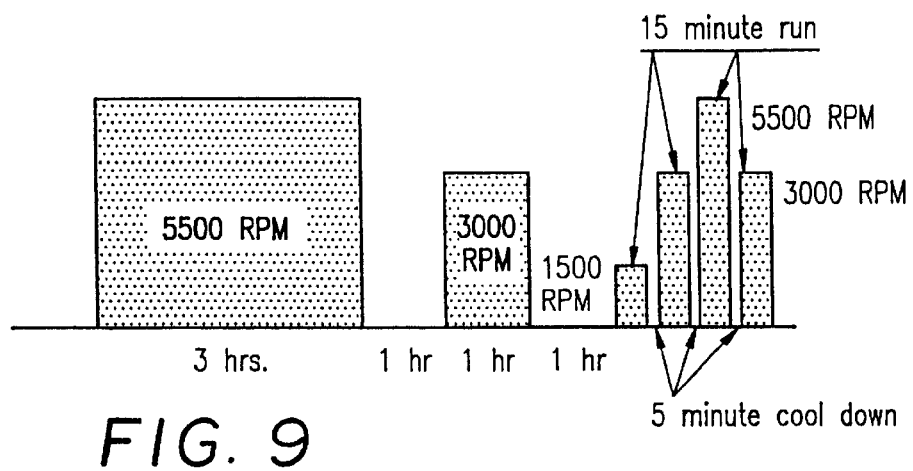
FIG. 9 is a graphical representation of a test cycle used in validating the model.
Figure 10:
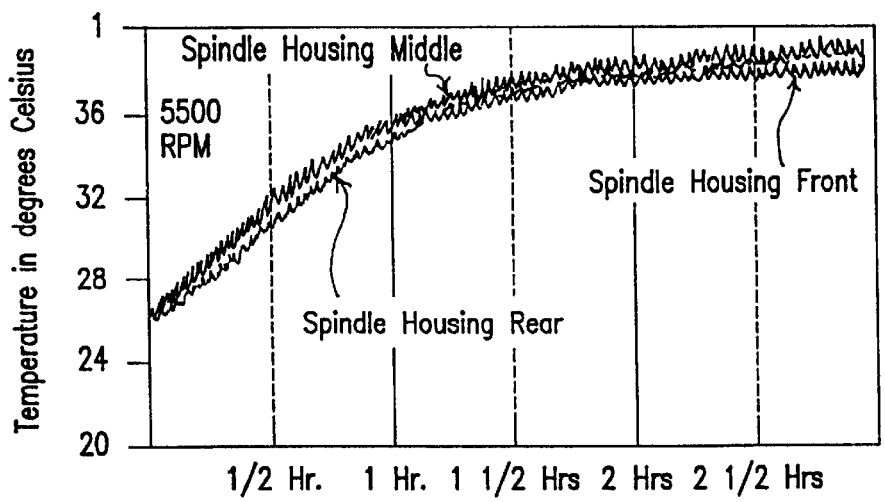
FIG. 10 is a graph showing temperature profiles for the front, middle and rear of the spindle housing for a 3 hour run at 5500 RPM in a dry environment.

The horizontal position, cold-start, dry environment test was conducted when the: machine was in an overnight cold condition. The test cycle included a three hour spindle run at 5500 RPM, 1 hour cool down, 1 hour spindle run at 3000 RPM, 1 hour cool down, and 15 minute spindle run at different speeds with 5 minute cool down runs in between. Such a test cycle was selected to address both transient and steady state thermal characteristics of the machine. FIG. 9 shows the test cycle. The thermal drifts of the spindle in X, Y and Z directions are listed in Table 4. The temperature profiles on spindle housing front, middle and rear for 3 hour run at 5500 RPM are shown in FIG. 10.

TABLE 4

Thermal errors, Dry environment

| | Drift in inches | | | Tilt in arcseconds | |
|---|---|---|---|---|---|
| | X axis | Y axis | Z axis | X axis | Y axis |
| 5500 RPM 3 hr. | .0027 | .0017 | −.0048 | 11.6 | −21.3 |
| 1 hr cooling | .0003 | −.0002 | .0006 | 3.1 | 1.1 |
| 3000 RPM 1 hr. | .0002 | −.0001 | .0007 | −1.0 | −3.5 |
| 1 hr cooling | .0002 | −.0001 | .0001 | 1.7 | 1.1 |
| 1500 RPM 15 min. | .0001 | −.0003 | .0003 | −3.4 | 4.5 |
| 5 min cooling | | | | | |
| 3000 RPM 15 min | .0001 | 0.00 | .0001 | 4.5 | −3.5 |
| 5 min cooling | | | | | |
| 5500 RPM 15 min | −.0002 | .0002 | −.0006 | 2.3 | −4.6 |
| 5 min cooling | | | | | |
| 3000 RPM 15 min | 0.0 | .0001 | .0002 | 1.1 | −6.9 |

Figure 11:
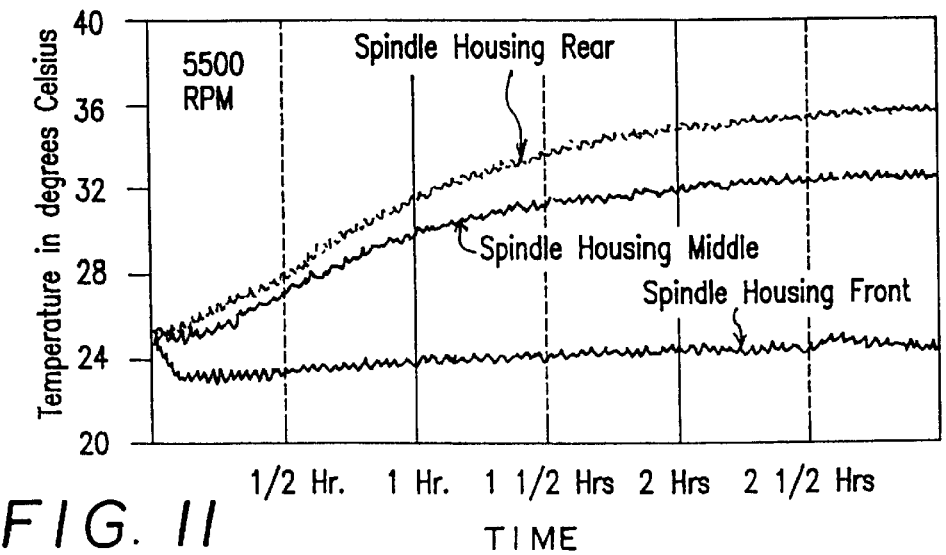
FIG. 11 is a graph showing temperature profiles for the front, middle and rear of the spindle housing for a 3 hour run at 5500 RPM in a wet environment.

The second test is exactly same as the previous test, but is conducted in a wet environment, whereby normal coolant flow was allowed in the machine. The test cycle included 3 hour spindle run at 5500 RPM, 1 hour cool down, 1 hour spindle run at 3000 RPM, 1 hour cool down, and 15 minute spindle run at different speeds with 5 minute cool down runs in between as shown in FIG. 9. The thermal drifts of the spindle in X, Y and Z directions are listed in Table 5. The temperature profiles on spindle housing front, middle and rear for 3 hour run at 5500 RPM are shown in FIG. 11.

TABLE 5

Thermal errors, Wet environment

| | Drift in inches | | | Tilt in arcseconds | |
|---|---|---|---|---|---|
| | X axis | Y axis | Z axis | X axis | Y axis |
| 5500 RPM 3 hr. | −.0029 | .0041 | −.0036 | 6.1 | −12.1 |
| 1 hr cooling | .0005 | −.0015 | −.001 | 3.5 | −7.6 |
| 3000 RPM 1 hr | −.0004 | .001 | .001 | −8.4 | 4.2 |
| 1 hr cooling | .0001 | −.0012 | −.001 | 3.3 | −3.1 |
| 1500 RPM 15 min | .0001 | .0001 | .0001 | −9.5 | 4.2 |
| 5 min cooling | | | | | |
| 3000 RPM 15 min | .0001 | .0005 | .0004 | −8.4 | 2.9 |
| 5 min cooling | | | | | |
| 5500 RPM 15 min | 0.0 | .0005 | −.0005 | −5.3 | 2.1 |
| 5 min cooling | | | | | |
| 3000 RPM 15 min | −.0001 | .0004 | .0008 | −5.2 | −2.5 |

The geometric and thermal characterization indicated that errors of the order as shown in Table 6 can be induced by geometry and thermal growth of the machine. It may be observed from the table that the errors due to thermal growth of the machine are more pronounced than the geometrical errors.

TABLE 6

Errors observed in characterization

|  | X axis | Y axis | Z axis |
|---|---|---|---|
| Geometric Errors inches | | | |
| Scale Error | 0.0013 | 0.0006 | 0.0027 |
| Positioning Error | 0.0004 | 0.0004 | 0.0002 |
| Thermal Errors inches | | | |
| Dry Environment | 0.0027 | 0.0017 | 0.0048 |
| Wet Environment | 0.0029 | 0.0041 | 0.0036 |

To verify the thermal errors induced in actual machining, a test part was machined in conditions similar to wet characterization. The test part and procedure are described in the following section.

Machining tests were conducted about two months after the characterization as per the procedures described above. The test included drilling and counterboring (Cbore) of a series of holes in 1" thick aluminum plate under cold start (cycle 1, holes 1–4), intermediate warm up (cycle 2, holes 5–8) and fully warm up (cycle 3, holes 9–12) conditions of the machine. The dimensions of the plate were so chosen as to include a typical machining envelope. In between the machining cycles the spindle was run at 5000 RPM for 1½ hours with coolant on and without any slide motion. After machining, the plate was allowed to cool down to CMM (Coordinate Measuring Machine) room temperature without unclamping and the dimensional accuracy of the holes drilled was measured. FIG. 12 shows the position of the holes in the aluminum plate. CMM results are tabulated in Table 7. The results indicate deviations from nominal values with reference to hole #1.

TABLE 7

Errors observed in machining test

|  | X axis | Y axis | Z axis |
|---|---|---|---|
| CYCLE I (from machine cold start) (t = 0) | | | |
| Hole 2 | 0.0003 | 0.0012 | 0.0001 |
| Cbore 2 | 0.0000 | 0.0013 | 0.0001 |
| Hole 3 | −0.0003 | 0.0009 | −0.0001 |
| Cbore 3 | −0.0005 | 0.0001 | −0.0001 |
| Hole 4 | 0.0010 | 0.0009 | 0.0020 |
| Cbore 4 | 0.0005 | 0.0000 | 0.0020 |
| CYCLE II (machine intermediate warm up) (t = 1½ hrs.) | | | |
| Hole 5 | 0.0021 | 0.0019 | 0.0057 |
| Cbore 5 | 0.0018 | 0.0019 | 0.0057 |
| Hole 6 | 0.0012 | 0.0018 | 0.0063 |
| Cbore 6 | 0.008 | 0.0019 | 0.0063 |
| Hole 7 | 0.0006 | 0.0016 | 0.0048 |
| Cbore 7 | 0.0003 | 0.0019 | 0.0048 |
| Hole 8 | 0.0020 | 0.0017 | 0.0044 |
| Cbore 8 | 0.0018 | 0.0019 | 0.0044 |
| CYCLE III (machine fully warm up) (t = 3 hrs.) | | | |
| Hole 9 | 0.0043 | 0.0053 | 0.0059 |
| Cbore 9 | 0.0040 | 0.0053 | 0.0059 |
| Hole 10 | 0.0038 | 0.0052 | 0.0042 |
| Cbore 10 | 0.0036 | 0.0051 | 0.0042 |
| Hole 11 | 0.0034 | 0.0049 | 0.0042 |
| Cbore 11 | 0.0032 | 0.0049 | 0.0042 |
| Hole 12 | 0.0044 | 0.0050 | 0.0057 |
| Cbore 12 | 0.0042 | 0.0051 | 0.0057 |

The errors in machining test are of the order of 0.0044" in X axis, 0.0053" in Y axis and 0.0059" in Z axis. These errors are a cumulative effect of geometric and thermal errors which are in reasonable agreement with the uncertainties computed from characterization errors which were 0.0033" in X axis, 0.0042" in Y axis and 0.0045" in Z axis respectively.

Figure 15:
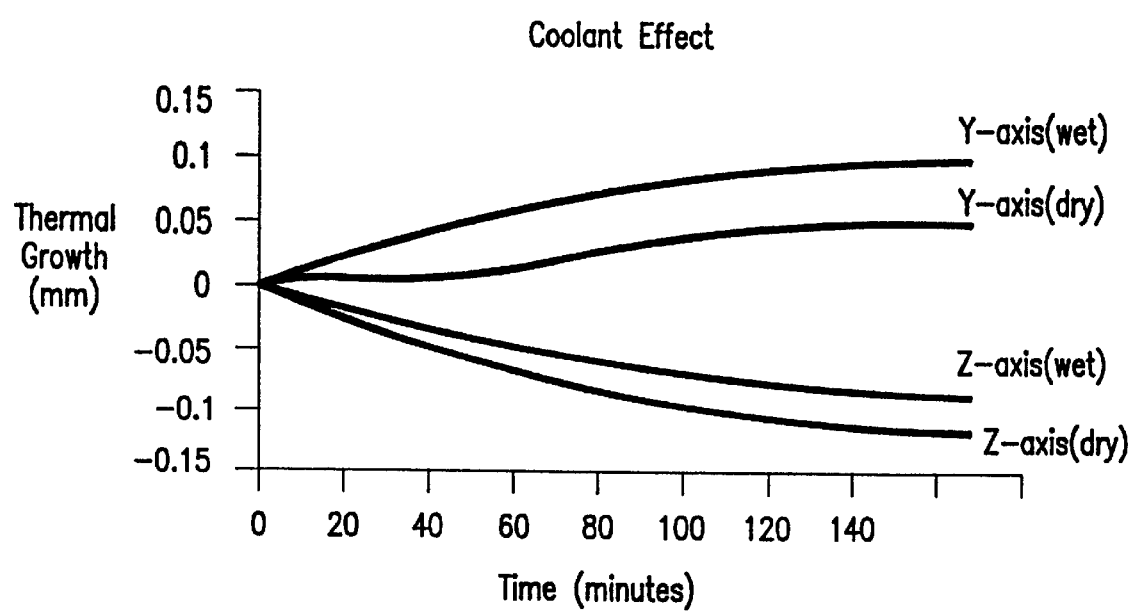
FIG. 15 is a graphical comparison of spindle growth in Y and Z axes under dry and wet conditions, indicating that coolant has a significant effect on spindle growth characteristics.

Contrary to the expectations of those skilled in this field, the temperature gradients between the front and rear of the spindle housing induced in a wet environment are greater than the temperature gradients induced in dry environment. Also, spindle growth in Y and Z axes is more in wet environment than in dry environment. FIG. 13 shows a comparison of the temperature gradients induced in dry and wet machining environments in front of spindle housing and FIG. 14 shows for the rear of spindle housing. FIG. 15 shows a comparison of spindle growth in Y and Z axes under dry and wet conditions indicating that coolant has significant effect on spindle growth characteristics.

Spindle growth is more dependent on temperature gradients than on absolute temperatures. Generally this resulted in higher thermal growth errors under wet conditions (a more realistic characterization) than under dry conditions.

The thermal model is preferably developed beginning with a general form of thermal error model for each axis of machine movement, as shown in Equation 1:

$$E_{im} = A_{0m} + A_{1m}\Delta T_{ie} + A_{2m}\Delta T_{ie}^2 + A_{3m}\Delta T_{id} + A_{4m}\Delta T_{id}^2 \qquad \text{(Eq. 1)}$$

where:

| | | |
|---|---|---|
| i | = | time stamp |
| m | = | machine axis (X, Y or Z) |
| $E_{im}$ | = | thermal growth errors predicted |
| $\Delta T_{ie}$ | = | $t_{i1} - t_{ie}$ |
| $t_{i1}$ | = | temperature recorded by 1th thermal sensor |
| $t_{ie}$ | = | environment temperature |
| $\Delta T_{id}$ | = | $t_{i1} - T_{ij}$ |
| $t_{ij}$ | = | temperature recorded by $j^{th}$ thermal sensor; and |
| $A_{0m} \ldots A_{4m}$ | = | coefficients of the model. |

Figure 16:
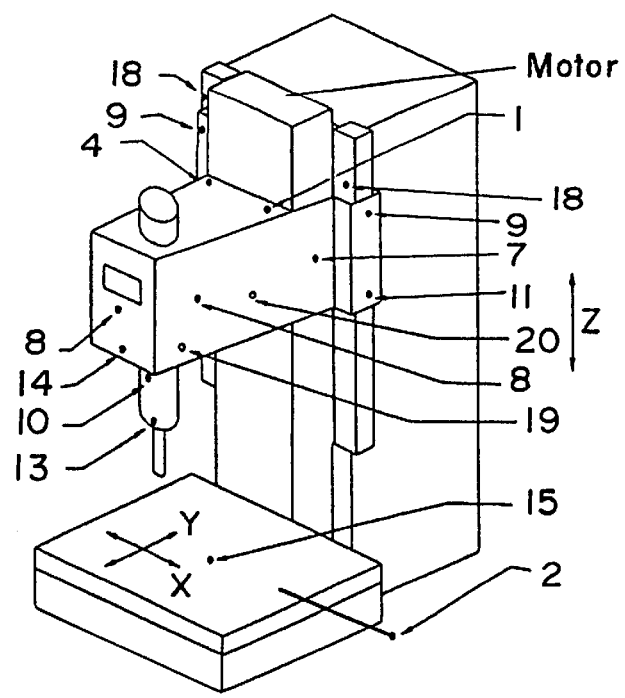
FIG. 16 is a schematic representation of typical thermal sensor mounting locations for a three axis machine to record temperature gradients.

Equation (1) calls for the use of multiple temperature measurements at all critical heat sources of the machine. To ensure that the temperature measurements are taken at all critical locations, a large number of thermal sensors are used initially. FIG. 16 shows a schematic of a three axis machine with thermal sensors mounted on typical locations to record the temperature gradients and FIG. 7 shows the set up for measurement of spindle thermal drift using capacitance or inductance gages. However, temperature recorded by all the thermal sensors may not be required for modeling temperature recorded by a particular thermal sensor or temperature gradient between two locations may have a better correlation to spindle growth in a particular axis than other thermal sensors.

To optimize the selection of sensors for modeling, a computer aided sensor correlation (CASC) algorithm is implemented after acquiring spindle thermal growth and drift together with temperature profiles at various locations. CASC is a real-time user-interface program available from API, Gaithersburg, Md., which helps the user identify key locations of the thermal sources on the machine, and optimize the number of thermal sensors required. For example, the initial number of thermal sensors used in the example herein was 20 and the final number may generally be only 4 or 5.

Figure 17:
FIG. 17 is a graphical representation of a Z-axis correlation of temperature measurements versus Z-axis growth, produced by the CASC algorithm.

The CASC program shows the relationships between correlation coefficients, capacitance gages, thermal sensors and range of the temperature data. FIG. 17 shows the relationship between the temperatures at various locations and spindle thermal drift as measured by capacitance gage #3 (Z axis). The upper half of the graph displays how closely the readings of thermal sensors 1 to 20 correlate to the displacement measured by capacitance gage #3. The closer the correlation coefficient is to 1, the better is the temperature correlation to the capacitance gage measurement. The lower half of the graph shows the range of temperatures measured by the thermal sensors. For example the last bar to the right of the plot has a number 13 at the top indicating thermal sensor #13 has a correlation coefficient of approximately 0.97 and temperature change of 16° C. The information from these plots is used to minimize the number of temperature sensors required for modeling; sensors showing lower correlation coefficients can be eliminated.

The CASC program performs correlation analysis, which is a statistical method used to reflect the degree of the linear relationship between two variables. The correlation coefficient denoted by $\gamma$ is defined as:

$$\gamma = \frac{\sum (x_i - \bar{x})(y_i - \bar{y})}{\sqrt{\sum (x_i - \bar{x})^2 \sum (y_i - \bar{y})^2}}$$

Where:
$x_i$, $y_i$ = values of variables x and y,
$\bar{x}$, $\bar{y}$ = mean value of $x_i$ and $y_i$,
$\gamma$ = correlation coefficient between x and y.

The value of the correlation coefficient $\gamma$ is zero if x and y are random occurrences and are unrelated to each other. The value of $\gamma$ is 1 if they are totally related, i.e., if y=f(x). In the case of CASC, let $\gamma$ be the correlation coefficient between the thermal sensors and the spindle-axis growths. Then $\gamma$ has the form:

$$\gamma_{lk} = \frac{\sum (t_{il} - \bar{t}_l)(d_{ik} - \bar{d}_k)}{\sqrt{\sum (t_{il} - \bar{t}_l)^2 \sum (d_{ik} - \bar{d}_k)^2}}$$

Where:
$t_{il}$ = values of thermal sensor $t_l$, l is sensor number from 1 to 20,
$\bar{t}_l$ = mean value of $t_{il}$,
$d_{ik}$ = values of capacitance sensor $d_k$, k is sensor number from 1 to 5,
$\bar{d}_k$ = mean value of $d_{ik}$
$\gamma_{lk}$ = correlation coefficient between $t_l$ and $d_k$,
i = time stamp.

CASC calculates the correlation coefficients between the thermal drift as measured by each capacitance gage and the temperature as measured by each thermal sensor. It then prioritizes the thermal sensors (from high to low) based on the $\gamma$ values. As noted above, FIG. 17 illustrates the results of a Z-axis correlation, temperature measurements against Z-axis growth, produced by CASC. The correlation values are shown as bars above the horizontal line while the bottom half of the graph shows the actual temperature range measurements. The sensors were prioritized based on their $\gamma$ value, and plotted with the highest value sensor on the right. As can be seen, thermal sensor #13, which had the highest temperature increase, with +15° C., also had the highest $\gamma$ value. As shown in FIG. 16, it was located at the spindle nose, closest to the lower spindle bearing. CASC showed that sensor #13 had the highest correlation to the Z-axis growth of the machine spindle.

It is important to realize that higher temperature measurements do not automatically imply higher $\gamma$ values. As is illustrated in FIG. 17, sensor #7 experienced less temperature increase, but was shown to have a higher $\gamma$ value than that of #1.

Automatic sensor selection using purely $\gamma$ values could be misleading since the locations of the sensors on the machine would not be a factor in the evaluation process. In other words, there could be sensors that were located at places where they were simply measuring the same heat source, and both would present a high $\gamma$ value. For example, such a pair of sensors would be #13 and #10. To prevent this condition, it is necessary for CASC to establish a second correlation process to check the correlation between thermal sensors. This process is referred to as autocorrelation, in other words, correlation between the same type of variable, in this case thermal variation.

For this purpose the autocorrelation coefficient $\alpha$ is defined as:

$$\alpha_{lk} = \frac{\sum (t_{il} - \bar{t}_l)(t_{ik} - \bar{t}_k)}{\sqrt{\sum (t_{il} - \bar{t}_l)^2 \sum (t_{ik} - \bar{t}_k)^2}}$$

Where:
$t_{il}$ = values of thermal sensor $t_l$, l is sensor number from 1 to 20,
$\bar{t}_l$ = mean value of $t_{il}$,
$t_{ik}$ = values of capacitance sensor $t_k$, k is sensor number from $1 < k \leq 20$,
$\bar{t}_k$ = mean value of $t_{ik}$
$\alpha_{lk}$ = correlation coefficient between $t_l$ and $t_k$,
i = time stamp.

If two thermal sensors monitor roughly the same heat source, $\alpha$ should be close to unity. Based on experience, 0.97 was selected as the threshold value for $\alpha$. In other words, if two or more sensors had an $\alpha$ equal to or larger than 0.97, then only one would be selected. The remaining ones would be eliminated in the modeling. As an example, the autocorrelation coefficient of thermal sensors #13 and #10 was 0.985. As a consequence, either #10 or #13 is eliminated from the final setup.

In summary, the operating procedures of CASC are:
(a) prioritize the thermal sensors based on the thermal-to-displacement correlation coefficient value, $\gamma$,
(b) establish a figure-of-merit based on the thermal-to-thermal autocorrelation coefficient value, $\alpha$, and
(c) eliminate the redundant thermal sensors that have $\alpha$ values equal to or greater than 0.97.

Conceivably, the number of thermal sensors should be increased in order to provide a robust enough model. This decision can be made by looking at the residual value R of the regression analysis. Note that the value of R is unity when a perfect model is; established. An iterative modeling process can be used to ensure that the model is optimized. This is evidenced by having a value for R that is close to unity. Typically a second or subsequent model, using the one or two additional sensors having the next higher $\gamma$ values, are generated. Then the R values of the models are compared. If the value of R improves by more than 1% over the previous model, the iterative process will continue. Empirically, the inventors have found that the optimizing process seldom requires more than five iterations. As a example of how the process works, the initial CASC model may suggest the use of only two thermal sensors, such as one for the table and one for the spindle. After the iterative process, the optimal model may require four sensors, namely one for the table, one for the spindle and one differential pair. FIG. 8 shows a schematic of the machining center with thermocouples mounted for the exemplary 5-axis machine. As noted above, to generate the thermal model for this machine, initially, a series of tests are conducted to determine which sensor placements will be most effective in developing the model. These tests preferably include a warm up run (after overnight cool down), a run with various spindle speeds after machine is in fully warmed-up condition, a production cycle run simulating an actual production cycle, and a cool down run. In these tests, horizontal spindle position is measured in a wet environment, i.e. with normal operating coolant flow.

The temperature data and inductance gage data from the tests is then combined and the CASC algorithm described above is used to identify the optimal set of thermal sensors to be used, by examination of correlation coefficients. In the example, Thermal sensors $T_8$ and the pair ($T_8$, $T_{15}$) were selected for the X-axis, $T_6$ and the pair ($T_6$,$T_8$) for the Y-axis, and $T_7$, $T_9$, and the pairs ($T_{11}$,$T_{20}$) and ($T_7$,$T_{11}$) for the Z-axis. Sensor $T_{18}$ mounted on the machine table was selected as the datum. The data from these thermal sensors was then substituted in equation (1) to establish a thermal error prediction model for X, Y and Z axes as follows:

$$E_z = 0.4179 + 0.114*(T_8-T_{18}) - 0.0008*(T_8-T_{18})^2 - 0.0128*(T_8-T_{15}) + 0.0005*(T_8-T_{15})^2 \quad (2)$$

$$E_y = 0.4017 + 0.0045*(T_6-T_{18}) = 0.00004*(T_6-T_{18})^2 = 0.05712*(T_6-T_8) - 0.00074*(T_6-T_8)^2 \quad (3)$$

$$E_x = 0.5248 + 0.015*(T_8-T_{18}) - 0.00041*(T_8-T_{18})^2 - 0.020*(T_9-T_{18}) + 0.0015*(T_9-T_{18})^2 + 0.00062*(T_{11}-T_{20}) - 0.00056*(T_{11}-T^{20})^2$$

$$-0.0068*(T_7-T_{11}) - 0.000084*(T_7-T_{11})^2 \quad (4)$$

Figure 18A:
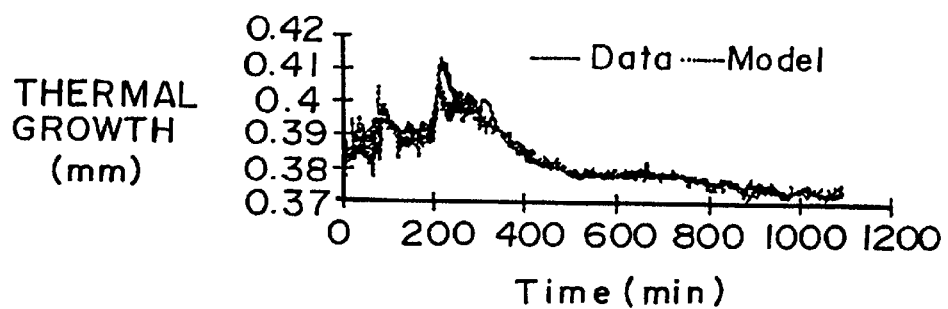
FIGS. 18a, 18b, and 18c show the comparison of experimental results and model-predicted results for spindle growth in X, Y and Z axes, respectively.
Figure 18B:
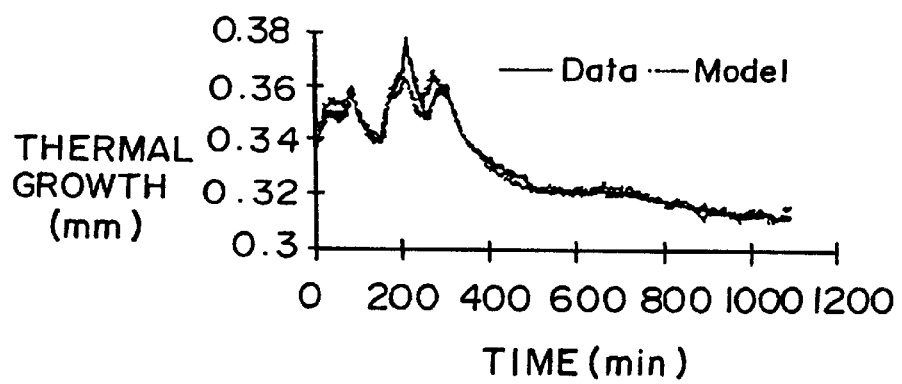
Figure 18C:
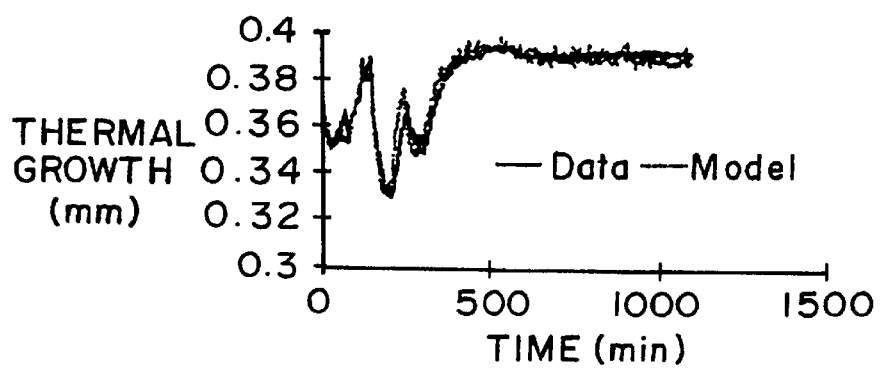

FIGS. 18a, 18b, and 18c show the comparison of experimental results and model-predicted, results for spindle growth in X, Y and Z axes, respectively.

Figure 19A:
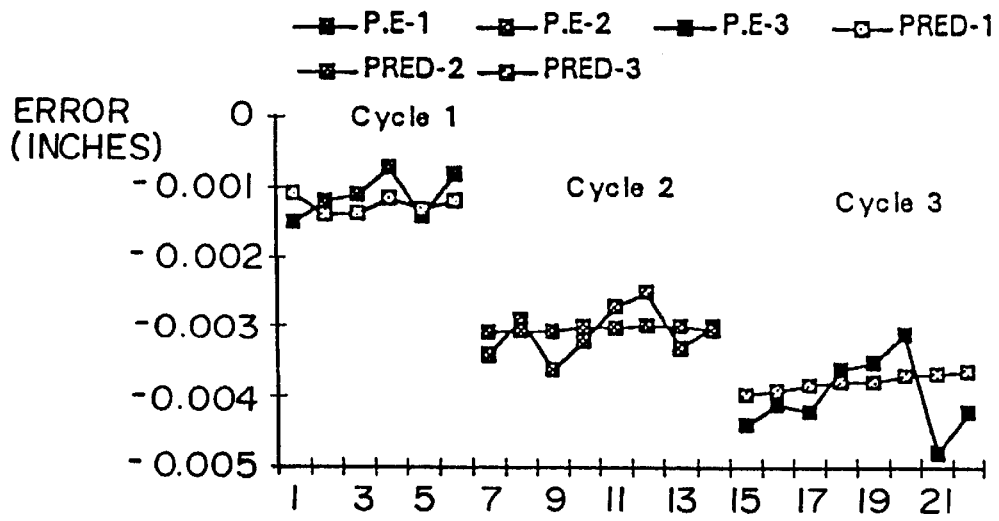
FIGS. 19a, 19b, and 19c graphically represent the comparison of actual part errors and exemplary model predicted errors for X, Y, and Z axes respectively.
Figure 19B:
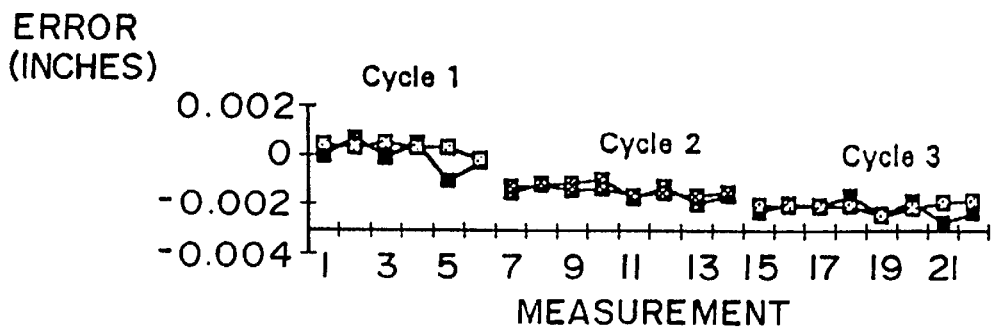
Figure 19C:
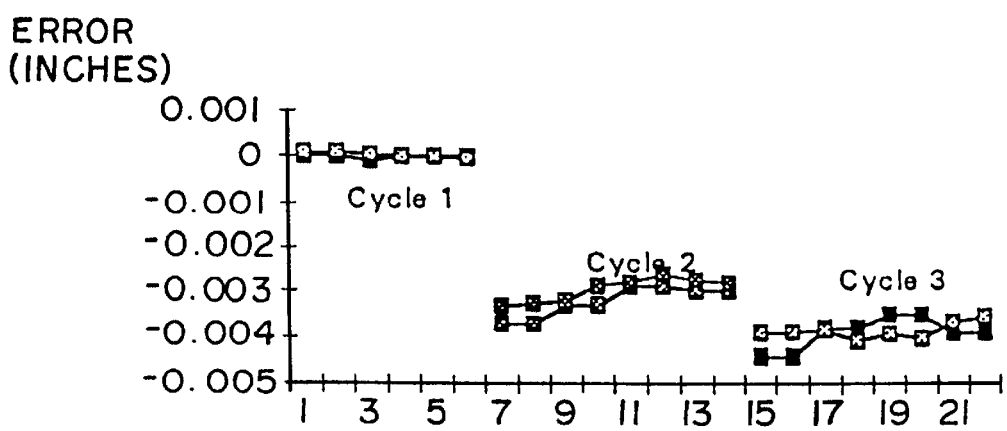

The accuracy of the resultant model may be verified by comparing the model predicted errors with the part errors in an actual machining test under wet conditions, by drilling counterbores in an aluminum plate as described previously with reference to FIG. 12. The measured position errors can then be compared with the model predictions. FIGS. 19a, 19b, and 19c graphically represent the comparison of actual part errors and the model predicted errors for X, Y, and Z axes respectively for this example.

The use of the novel model of the present invention for real time error compensation will now be described in detail. For compensation of the modeled errors, the model constructed as described above is installed in a real time error compensation (RTEC) controller. The RTEC controller is preferably constructed and operates generally according to the disclosure of U.S. Pat. No. 5,375,066, the disclosure of which is incorporated herein by reference.

Generally, inputs from thermal sensors arranged on the machine are applied as an input to the global differential wet model described above, and the model is used to determine the appropriate real time compensation input to the feedback positioning signals generated by the machine controller. Thus, the RTEC controller modifies the encoder-type position feedback signals used by the machine to compensate for both geometric and thermal errors in the manner dictated by the global differential wet model.

Figure 20:
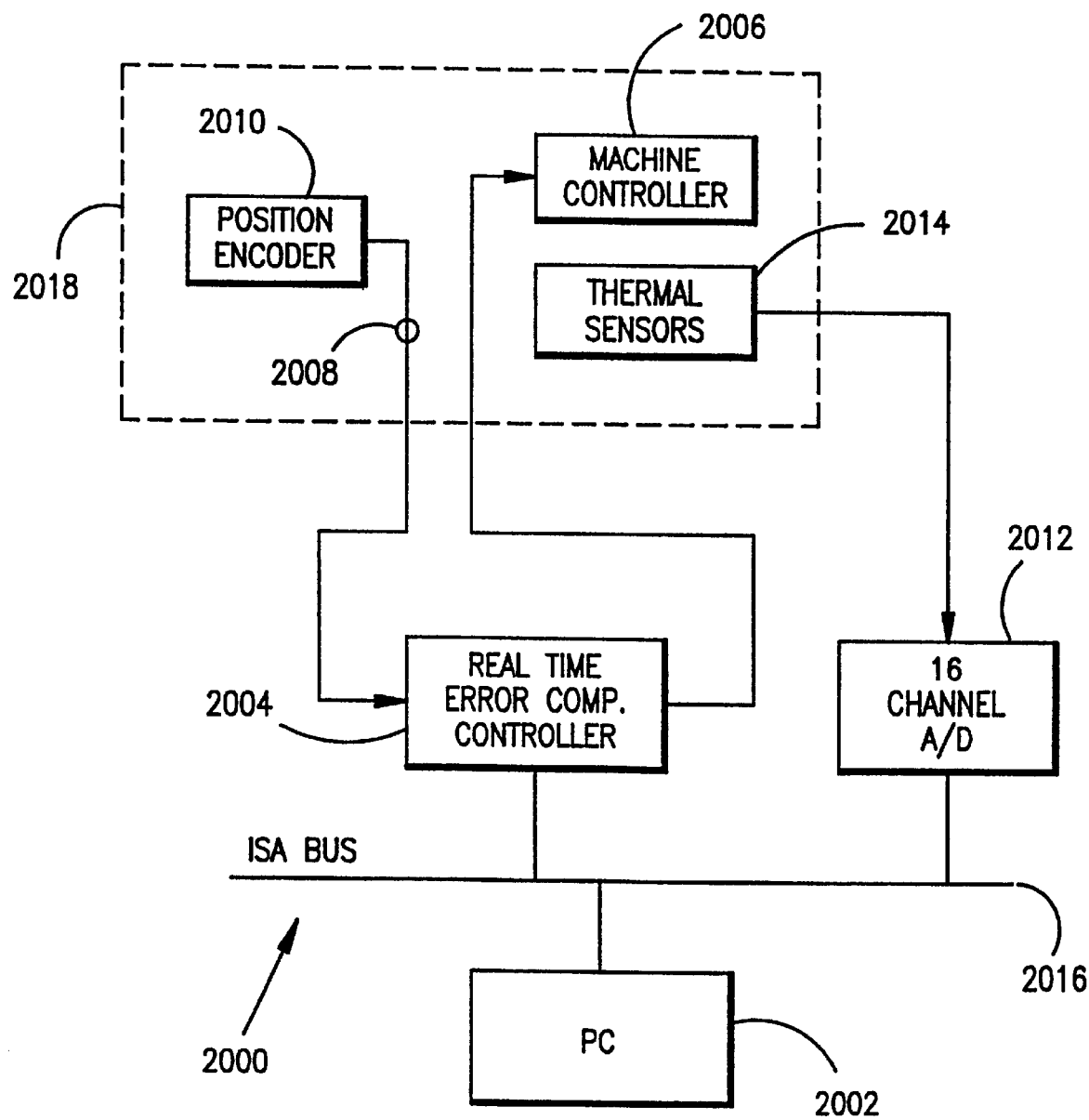
FIG. 20 is a block schematic diagram of the real time error compensating controller according to the present invention.

Referring to FIG. 20, error control system 2000 is preferably implemented using an IBM-compatible personal computer 2002 which stores the data defining the global differential wet model of a machine tool 2018. The global differential wet model is used by computer 2002 to control manipulation of encoder position feedback signals 2008 (generated by position encoders 2010) by RTEC controller 2004 before they are sent to machine controller 2006. While intercepting the encoder feedback pulses 2008, RTEC controller 2004 determines the number of pulses to be added or subtracted from the feedback signal based on signals from computer 2002 which are controlled by the global differential wet model. The number of pulses to be added or subtracted are determined by the amount of position compensation dictated by the thermal model and compensation algorithm in computer 2002. The entire compensation system is transparent to the machine controller, hence, intricate detailed knowledge of the machine controller is not required for effective compensation.

As shown in FIG. 20, RTEC controller 2004 is placed between the precision position encoders 2010 (e.g. glass scales) and machine controller 2006 in the position feedback loop. RTEC controller 2004 is constructed on a PC plug-in card based on a TI floating point DSP, according to known principles disclosed for example in U.S. Pat. No. 5,275,066 to Yee et al. A general purpose 16 channel 14-bit A/D conversion PC plug-in card 2012 is provided as an interface for thermal sensors 2014 which are mounted on them. machine tool. RTEC controller 2004 tracks the raw position of the machine, manipulatinig (adding or subtracting) pulses to the machine controller, and communicating with computer 2002 through ISA bus 2016. Computer 2002 runs a frontend user interface, the machine error correction model, and reads in the thermal data for processing by the model.

The error correction model for machine 2018, which runs in computer 2002, deduces the thermal correction from thermal sensors 2014. As noted above, the model is preferably a differential model, so the thermal correction is determined based on changes in measured ambient temperature at the sensors, rather than on absolute temperature measurements. The overall correction value is then sent to RTEC controller 2004 which manipulates the quadrature feedback pulses going to machine controller 2006 to achieve compensation. Computer 2002 continuously requests the current position of machine 2018 and the status of the system from RTEC controller 2004 and sends the compensation periodically to RTEC controller 2004.

RTEC controller 2004 is designed so that the original encoder feedback signal 2008 passes through RTEC controller 2004 to machine controller 2006 uncorrupted in the absence of RTEC controller 2004 operation. This bypass feature ensures safe operation of machine 2018, should RTEC controller 2004 fail for any reason. Also, as an additional safeguard the RTEC software limits the maximum number of pulses added or subtracted to and from the original pulses. This feature prevents unreasonable compensation to the machine and thus avoids a possible machine crash.

After successfully interfacing RTEC controller 2004 with machine controller 2006, a series of machining tests were conducted to validate the combination of the modeling methodology and its application for real time error correction. Three similar machining tests were conducted under wet conditions. Test 1 was conducted after over night cool down of the machine without implementing any compensation to assess the actual machining errors. Test 2 was conducted when the machine was in fully warm up condition and with implementation of real time error compensation. Test 3 was conducted after over night cool down of the machine and with implementation of real time error compensation. The cutting tests included drilling and counterboring (Cbore) of a series of holes in 1" track aluminum plate under cold start (cycle I), intermediate warm up (cycle II) and warm (cycle III) core drilled in two successive passes in each cycle; the four holes in second pass are drilled with an offset of 1" in X direction with respect to the four holes drilled in first pass. In between the machining cycles, the spindle was run at 5000 RPM with 1½ hours with coolant on and without any slide motion. FIG. 12 shows the position of the holes of the aluminum plate for these tests. FIGS. 21a, 21b, and 21c show the errors observed in test 1 in X, Y and Z axes respectively without any compensation. FIGS. 22a, 22b, and 22c show results for X, Y, and Z axes respectively as observed in test 2, with compensation according to the present invention. FIGS. 23a, 23b, and 23c show positioning errors for X, Y, and Z axes observed in test 3 with compensation according to the present invention. These results indicate deviations from the nominal values with reference to hole #1.

Thus, cutting tests performed without and with compensation demonstrated the effectiveness of the global characterization and the compensation methodology. Also, the robustness of the models were demonstrated by performing different cutting tests and starting the machine from a semi-warm state and a cold state and showing that in both cases the thermal errors were substantially reduced. This improvement in accuracy is a result of using the global differential wet model as described above. Of course, despite the robust nature of this model, machine to machine variations and the deterioration of the mechanical conditions of the components and subassemblies of the machines with time may change the geometric and thermal characteristics of the machine, requiring updating of the model.

In conclusion, it can be seen that the present invention provides an improved apparatus and method for accurately modeling geometric and thermal errors in a machine tool, and for controlling the machine tool to provide real time compensation for those errors.

We claim:

1. A method of compensating for positioning errors in a device with a precision positioning control, comprising the steps of:
    (1) measuring positioning errors of the device relative to changes in temperature at a plurality of changes in temperature;
    (2) creating a global differential wet model of positioning errors from the measured positioning errors, and
    (3) measuring relative temperature changes in real time and using said model to generate real time position compensation signals to modify the operation of the device.

2. The method of claim 1 further comprising the step of modifying position feedback signals used by the machine to compensate for geometric and thermal errors based on the position compensation signals.

3. The method of claim 2, wherein the step of modifying is performed by intercepting feedback pulses and determining a number of pulses to be added or subtracted from the feedback pulses based on the global differential wet model.

4. The method of claim 3, wherein the number of pulses to be added or subtracted is less than or equal to a predetermined maximum number.

5. The method of claim 1, wherein the step of creating a global differential wet model is performed by collecting position data directly from a plurality of points on the device, during a period of time when coolant is flowing through the device.

6. The method of claim 5, wherein the step of creating a global differential wet model is further performed by determining, from the collected position data, position error produced by differential changes in temperature.

7. The method of claim 1, further comprising the step of storing the global differential wet model in a real time compensation controller prior to the step of measuring the relative temperature changes.

8. A system for compensating for positioning errors in a device with a precision positioning control, comprising:
    a plurality of thermal sensors located in various positions on the device for determining temperature changes at the various positions;
    a plurality of positioning sensors located on the device for determining device position;
    means for collecting temperature change and position data during operation of the device to create a global differential wet model; and
    a controller for storing the global differential wet model, wherein the controller generates real time position compensation signals based on the global differential wet model to modify the operation of the device precision positioning control.

9. The system of claim 8, wherein the device is cooled by coolant flow, and the global differential wet model is created during a period of coolant flow in the device.

10. The system of claim 8, wherein the controller intercepts a feedback pulse train received from the positioning sensors, and modifies the feedback pulse train using the real time position compensation signals.

11. The system of claim 10, wherein the controller determines a number of pulses to be added or subtracted to the feedback pulse train.

12. The system of claim 11, wherein the number of pulses is less than or equal to a predetermined maximum number.

13. The system of claim 10, wherein the feedback pulse train passes through the controller to the precision positioning control in the absence of controller operation.

14. The system of claim 8, wherein the controller is constructed on a plug-in card for a personal computer.

* * * * *